(12) United States Patent
Kodali

(10) Patent No.: US 10,306,911 B2
(45) Date of Patent: Jun. 4, 2019

(54) SYSTEM AND METHOD OF PROCESSING PRODUCE

(71) Applicant: Nagendra B. Kodali, Pelham, NH (US)

(72) Inventor: Nagendra B. Kodali, Pelham, NH (US)

(*) Notice: Subject to any disclaimer, the term of this patent is extended or adjusted under 35 U.S.C. 154(b) by 277 days.

(21) Appl. No.: 15/040,808

(22) Filed: Feb. 10, 2016

(65) Prior Publication Data

US 2017/0000184 A1  Jan. 5, 2017

Related U.S. Application Data

(63) Continuation of application No. 14/591,558, filed on Jan. 7, 2015, now Pat. No. 9,265,280, which is a continuation of application No. 14/558,287, filed on Dec. 2, 2014, now Pat. No. 9,185,930, which is a continuation-in-part of application No. 14/153,577, filed on Jan. 13, 2014, now Pat. No. 9,173,432, which is a continuation-in-part of application No.

(Continued)

(51) Int. Cl.
| | | |
|---|---|---|
| A23N 15/00 | (2006.01) |
| A23N 15/02 | (2006.01) |
| A23N 15/04 | (2006.01) |
| B65G 15/16 | (2006.01) |
| B65G 15/42 | (2006.01) |
| B65G 37/00 | (2006.01) |

(52) U.S. Cl.
CPC ............ *A23N 15/02* (2013.01); *A23N 15/04* (2013.01); *B65G 15/16* (2013.01); *B65G 15/42* (2013.01); *B65G 37/00* (2013.01); *A23N 2015/008* (2013.01); *B65G 2201/0211* (2013.01)

(58) Field of Classification Search
CPC ........ A23N 15/02; A23N 15/04; B65G 15/04; B65G 15/16; B65G 15/42; B65G 37/00
USPC .................. 99/636, 637, 638, 640, 642, 643
See application file for complete search history.

(56) References Cited

U.S. PATENT DOCUMENTS

| 2,217,679 A | 10/1940 | Gray et al. |
| 2,361,834 A | 10/1944 | Frova |

(Continued)

FOREIGN PATENT DOCUMENTS

| CN | 1754446 | 4/2006 |
| CN | 102006771 | 4/2011 |

(Continued)

OTHER PUBLICATIONS

Second Office Action on CN 2014800166128 dated Jun. 7, 2017.

(Continued)

*Primary Examiner* — Thien S Tran
(74) *Attorney, Agent, or Firm* — Foley & Lardner LLP; James De Vellis

(57) ABSTRACT

Systems and methods of de-stemming produce are provided. An apparatus can process an item of produce having a first portion and a second portion attached to the first portion. The apparatus can include at least one first conveyor unit that can convey the first portion of the item of produce in a first direction. The apparatus can include at least one second conveyor unit that can convey the second portion of the item of produce in a second direction that differs from the first linear direction by between zero and 90 degrees to generate a separation force between the first portion of the item of produce and the second portion of the item of produce that separates the first portion from the second portion.

16 Claims, 21 Drawing Sheets

Related U.S. Application Data

13/758,276, filed on Feb. 4, 2013, now Pat. No. 9,173,431.

(56) References Cited

U.S. PATENT DOCUMENTS

| | | | |
|---|---|---|---|
| 2,486,367 A | 10/1949 | Abrey et al. | |
| 2,731,051 A | 1/1956 | Herbert et al. | |
| 3,164,182 A | 1/1965 | Hughes et al. | |
| 3,291,036 A | 12/1966 | Perl | |
| 3,389,731 A | 6/1968 | Ferdinand | |
| 3,396,770 A | 8/1968 | Buchner | |
| 3,419,142 A | 12/1968 | Baker et al. | |
| 3,508,557 A | 4/1970 | Sunday | |
| 3,734,004 A | 5/1973 | Losito | |
| 3,820,450 A | 6/1974 | Rasmussen et al. | |
| 3,989,110 A | 11/1976 | Medlock et al. | |
| 4,237,909 A | 12/1980 | Jenkins et al. | |
| 4,367,675 A | 1/1983 | Boots | |
| 4,382,332 A | 5/1983 | Dominge | |
| 4,430,933 A | 2/1984 | Boots | |
| 4,836,220 A | 6/1989 | Miyake et al. | |
| 4,981,220 A | 1/1991 | Kolodesh et al. | |
| 5,066,507 A | 11/1991 | Miwa et al. | |
| 5,234,375 A | 8/1993 | Hendriks | |
| 5,245,918 A | 9/1993 | Volk, Sr. | |
| 5,341,914 A | 8/1994 | Demars et al. | |
| 5,824,356 A | 10/1998 | Silver et al. | |
| 5,851,146 A | 12/1998 | Schloesser | |
| 6,237,477 B1 | 5/2001 | Huddle | |
| 6,263,788 B1 | 7/2001 | Chiang | |
| 6,550,366 B2 | 4/2003 | Ortega et al. | |
| 6,708,694 B2 | 3/2004 | Dombek | |
| 7,717,046 B2 | 5/2010 | Sprouse et al. | |
| 7,810,631 B2 | 10/2010 | Kawakami | |
| 8,311,339 B2 | 11/2012 | Chu | |
| 2001/0032651 A1* | 10/2001 | Dombek | A24C 5/471 |
| | | | 131/281 |
| 2005/0185278 A1 | 8/2005 | Horsten et al. | |
| 2005/0206610 A1 | 9/2005 | Cordelli | |
| 2008/0289515 A1 | 11/2008 | Knorr et al. | |
| 2011/0048253 A1 | 3/2011 | Melandri et al. | |
| 2011/0199294 A1 | 8/2011 | Vilcovsky | |
| 2012/0294991 A1* | 11/2012 | Knorr | A23N 15/02 |
| | | | 426/231 |
| 2013/0064950 A1* | 3/2013 | Randazzo | A23N 15/02 |
| | | | 426/484 |

FOREIGN PATENT DOCUMENTS

| | | |
|---|---|---|
| EP | 1 914 183 A1 | 4/2008 |
| JP | 2001-224349 | 8/2001 |

OTHER PUBLICATIONS

Associated Press, New Mexico Chile Numbers Down for 2013, Mar. 27, 2014.

Funk, P. et al., Pepper Harvest Technology, Peppers: Botany, Production and Uses, Chapter 17, CAB International 2012.

International Preliminary Report on Patentability dated Sep. 22, 2015 for PCT/US2014/011456.

International Preliminary Report on Patentability for PCT/US2014/025611 dated Sep. 15, 2015.

International Search Report and Written Opinion dated Mar. 16, 2015 for PCT Application No. PCT/US2014/011456.

International Search Report and Written Opinion dated Jul. 18, 2014 in PCT Application No. PCT/US2014/025611.

Moorman, Jane, "NMSU M-TEC engineers developing automated chile destemmer" NMSU News Center, Oct. 10, 2008 (5 pages).

Moorman, Jane, NMSU engineers developing automated chile destemmer, Southwest Farm Press, Mar. 4, 2009, 3 pages.

New Mexico Chile Association, Breeding Solutions Statement, undated, retrieved from URL: http://www.nmchileassociation.com/id27.html on May 29, 2015.

Notice of Allowance for U.S. Appl. No. 13/758,276 dated Jun. 30, 2015.

Notice of Allowance for U.S. Appl. No. 14/153,577 dated Jul. 2, 2015.

Notice of Allowance for U.S. Appl. No. 14/591,558 dated Oct. 21, 2015.

Offner, Jim, Researchers focus on techniques for harvesting peppers by machine, The Packer, Jul. 7, 2014.

Riggs, Nancy, Chile Mechanization Comes Closer, Growing Magazine, Oct. 1, 2011.

Robbins, Ted, Shortage of Workers hampers Chili Harvest in New Mexico, NPR, Oct. 13, 2013.

Roberts, Scott, Chile Pepper Industry to Increase Production, The Official Scott Roberts Website, 2009.

Soular, Diana Alba, NMSU's new green chile harvester fortells crop's future, Las Cruces News, Sep. 3, 2014.

U.S. Office Action for U.S. Appl. No. 14/591,558 dated Aug. 3, 2015.

U.S. Office Action in U.S. Appl. No. 14/153,577 dated May 19, 2015.

U.S. Office Action in U.S. Appl. No. 14/206,380 dated Apr. 30, 2015.

U.S. Office Action in U.S. Appl. No. 14/558,287 dated May 18, 2015.

U.S. Office Action in U.S. Appl. No. 14/591,558 dated May 19, 2015.

U.S. Office Action in U.S. Appl. No. 13/548,989 dated Feb. 11, 2014.

U.S. Office Action in U.S. Appl. No. 13/758,989 dated Mar. 20, 2015.

U.S. Office Action in U.S. Appl. No. 13/829,529 dated Mar. 6, 2015.

U.S. Office Action on U.S. Appl. No. 13/829,529 dated Sep. 11, 2015.

U.S. Office Action on U.S. Appl. No. 14/206,380 dated Nov. 5, 2015.

Walker, S., et al., Mechanizing Chile Peppers: Challenges and Advances in Transitioning Harvest of New Mexico's Signature Crop, HorTechnology, vol. 24, No. 3, Jun. 2014.

Office Action and Search Report on CN201480016612.8 dated Nov. 2, 2016.

* cited by examiner

SYSTEM AND METHOD OF PROCESSING PRODUCE

CROSS REFERENCES TO RELATED APPLICATIONS

This application claims priority as a continuation under 35 U.S.C. § 120 to U.S. patent application Ser. No. 14/591,558 filed on Jan. 7, 2015 and titled "SYSTEM AND METHOD OF PROCESSING PRODUCE," now U.S. Pat. No. 9,265,280, which claims priority as a continuation under 35 U.S.C. § 120 to U.S. patent application Ser. No. 14/558,287 filed on Dec. 2, 2014 and titled "SYSTEM AND METHOD OF PROCESSING PRODUCE," now U.S. Pat. No. 9,185,930, which claims priority as a continuation-in-part under 35 U.S.C. § 120 to U.S. patent application Ser. No. 14/153,577 filed on Jan. 13, 2014 and titled "SYSTEM AND METHOD OF PROCESSING PRODUCE," now U.S. Pat. No. 9,173,432, which claims priority as a continuation-in-part under 35 U.S.C. § 120 to U.S. patent application Ser. No. 13/758,276 filed on Feb. 4, 2013 and titled "SYSTEM AND METHOD OF DE-STEMMING PRODUCE," now U.S. Pat. No. 9,173,431, each of which is herein incorporated by reference in their entirety.

BACKGROUND

Agricultural products can be harvested manually or with the aid of harvesting machines. When agricultural products are harvested from a field, the agricultural products can be processed and distributed to consumers for consumption.

SUMMARY

At least one aspect is directed to an apparatus for processing produce. The apparatus can include a receiving unit. The receiving unit can receive an item of produce and can convey the item of produce. The apparatus can include a supplemental conveyor unit having a first channel wall and a second channel wall defining a channel between an end portion of the receiving unit and a top surface of a first conveyor unit. The channel can receive the item of produce from the receiving unit and can deposit at least part of the item of produce on the top surface of the first conveyor unit. The apparatus can include the first conveyor unit configured to convey the item of produce toward at least one additional conveyor unit. The apparatus can include the first conveyor unit and the at least one additional conveyor unit configured to apply at least part of a separation force to the item of produce to separate a first portion of the item of produce from a second portion of the item of produce.

At least one aspect is directed to a system of processing produce. The system can include a receiving unit that receives an item of produce and conveys the item of produce. The system can include a supplemental conveyor unit having a first channel wall and a second channel wall defining a channel between an end portion of the receiving unit and a top surface of a first conveyor unit. The channel can receive the item of produce from the receiving unit and can deposit at least part of the item of produce on the top surface of the first conveyor unit. The first conveyor unit can convey the item of produce toward at least one additional conveyor unit. The first conveyor unit and the at least one additional conveyor unit apply at least part of a separation force to the item of produce to separate a first portion of the item of produce from a second portion of the item of produce.

At least one aspect is directed to a method of processing produce. The method can include receiving an item of produce by a receiving unit, and conveying the item of produce in a first direction on a top surface of the receiving unit. The method can include receiving the item of produce in a channel defined by a first channel wall of a supplemental conveyor unit and a second channel wall of the supplemental conveyor unit. The method can include depositing, via the channel, the item of produce into a first conveyor unit that conveys the item of produce in a second direction to separate a first portion of the item of produce from a second portion of the item of produce by generating a separation force between the first portion of the item of produce and the second portion of the item of produce.

At least one aspect is directed to an apparatus for processing produce having a first portion and a second portion. The apparatus can include a sizing unit having a first roller and a second roller. The sizing unit can convey the produce in a first direction, and can release the produce vertically along a longitudinal axis of the produce between the first roller and the second roller during conveyance of the produce in the first direction. The apparatus can include a receiving unit having a produce receptacle. The receiving unit can receive the produce, in the produce receptacle, from the sizing unit and can convey the produce in the produce receptacle in a second direction. The second direction can be perpendicular (e.g., +/−10 degrees) to the first direction. The produce receptacle can have a cavity configured to receive the produce subsequent to release from the sizing unit with the first portion of the produce at least partially disposed in the cavity and with the second portion of the produce at least partially protruding from the cavity. The apparatus can include a first conveyor unit that can receive the first portion of the produce from the produce receptacle, and that can convey the produce in a third direction to separate the first portion of the produce from the second portion of the produce.

At least one aspect is directed to a system of processing produce. The system can include a sizing unit that can release the produce vertically along a longitudinal axis of the produce during conveyance of the produce in a first direction. The system can include a receiving unit having a first row of a first plurality of produce receptacles and a second row of a second plurality of produce receptacles in parallel with the first row. Each of the first row and the second row can be aligned along at least one of a lateral axis of the receiving unit and a longitudinal axis of the sizing unit. The receiving unit can convey the produce in a second direction. Each of the first plurality of produce receptacles and the second plurality of produce receptacles can receive a single item of produce. The system can include at least one conveyor unit that can receive the produce from the receiving unit and to convey the produce in a third direction.

At least one aspect is directed to a method of processing produce. The method can convey an item of produce in a first direction, and can release the item of produce in a vertical position during conveyance of the item of produce in the first direction. The method can receive the item of produce in a produce receptacle of a receiving unit during conveyance of the produce receptacle in a second direction with the produce receptacle oriented in a first position. The method can tip the produce receptacle from the first position to a second position to expel the item of produce from the produce receptacle onto at least one conveyor unit. The method can align the item of produce for engagement with at least one additional conveyor unit. The method can generate a separation force on the item of produce using the at least one conveyor unit and the at least one additional conveyor unit to at least partially separate a first portion of the item of produce from a second portion of the item of produce.

At least one aspect is directed to a de-stemming apparatus for de-stemming produce. The produce can have a pod, a stem, and a calyx. The de-stemming apparatus can include a first conveyor unit having a top surface that can convey the pod, and a second conveyor unit having a first portion proximate to the first conveyor unit and can have a second portion disposed at an angle of greater than zero and less than 60 degrees relative to the first conveyor unit. The de-stemming apparatus can include a third conveyor unit that can engage the pod between the top surface of the first conveyor unit and a bottom surface of the third conveyor unit. The de-stemming apparatus can include a fourth conveyor unit that can engage the stem between a top surface of the second conveyor unit and a bottom surface of the fourth conveyor unit. The de-stemming apparatus can include at least one driving unit that can drive at least one of the first conveyor unit, the second conveyor unit, the third conveyor unit, and the fourth conveyor unit to convey the produce from a first point of the de-stemming apparatus to a second point of the de-stemming apparatus. The at least one driving unit can generate a separation force between the pod and the stem that separates at least a portion of the stem and at least a portion of the calyx from the pod during conveyance of the produce between the first point and the second point.

At least one aspect is directed to an apparatus for processing an item of produce having a first portion and a second portion attached to the first portion. The apparatus can include at least one first conveyor unit that can convey the first portion of the item of produce in a first linear direction. The apparatus can include at least one second conveyor unit that can convey the second portion of the item of produce in a second linear direction that differs from the first linear direction by between 0.5 and 30 degrees to generate a separation force between the first portion of the item of produce and the second portion of the item of produce that separates the first portion from the second portion.

At least one aspect is directed to an apparatus for processing produce. The apparatus can include means for conveying produce having a pod and a stem from a first point to a second point at a constant speed with the pod fixed in a first trajectory and the stem fixed in a second trajectory that deviates from the first trajectory by an angle greater than zero and less than 45 degrees to generate a separation force between the pod and the stem that separates at least a portion of the stem from the pod during conveyance from the first point through the second point.

At least one aspect is directed to a method of processing produce. The method can convey an item of produce having a pod and a stem through a de-stemming apparatus at a constant speed from a first point to a second point with the pod fixed in a first trajectory and the stem fixed in a second trajectory that deviates from the first trajectory by an angle greater than zero and less than 45 degrees. The method can generate a separation force between the stem and the pod that separates at least a portion of the stem from the pod between the first point and the second point.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for processing produce. The various concepts introduced above and discussed in greater detail below may be implemented in any of numerous ways, as the described concepts are not limited to any particular manner of implementation. Examples of specific implementations and applications are provided primarily for illustrative purposes.

Agricultural products, e.g., produce such as fruits or vegetables, can be harvested from farms. The produce can be harvested or picked by farmers manually, with the use of harvesting machines, or using combinations thereof. When the produce is harvested, the edible portion of the produce can be picked from a plant together with additional portions of the plant that are generally not eaten. For example, a pepper having a pod (generally eaten) and a stem (generally not eaten) can be removed from a pepper plant with at least a portion of the stem still attached to the pod.

A de-stemming apparatus can separate the stem and other portions of the produce that are generally not eaten from the body or pod of the produce that is generally eaten. For example, the de-stemming apparatus can include at least one conveyor unit. The produce can be placed on at least one conveyor unit to travel from a first point to a second point of the de-stemming apparatus. During this travel the pod of the produce can be held in a first fixed position and conveyed along a first trajectory, and the stem (or other portion of the produce) can be held in a second fixed position and conveyed along a second trajectory. Divergence between the first and second trajectories (e.g., by between zero and 90 degrees) with the pod held in the first position and the stem held in the second position can generate a separation force during conveyance between the first and second points of the de-stemming apparatus. The separation force can pull at least the stem of the produce apart from the pod of the produce and can remove at least a portion of the stem from the pod of the produce.

Figure 1:
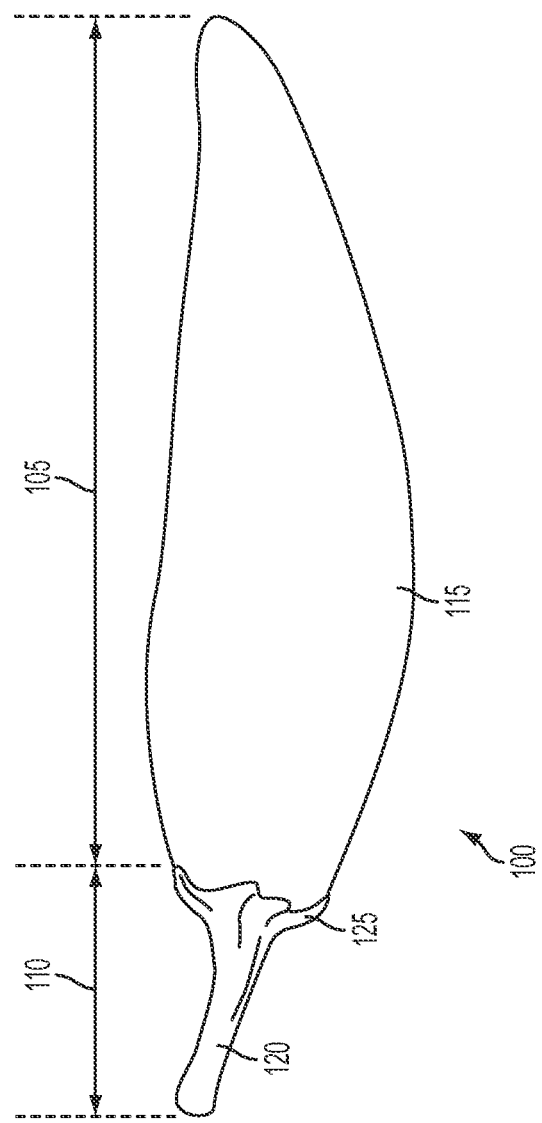
FIG. 1 is an illustration depicting one example of an item of produce, according to an illustrative implementation.

FIG. 1 illustrates an example of an item of produce 100. As illustrated in the example of FIG. 1, the produce 100 is a pepper, although the produce 100 can be other agricultural products such as fruits, vegetables, tomatoes, lemons, citrus, olives, carrots, eggplant, cucumbers, zucchini, squash, melons, peas, beans, legumes, tubers, onions, radishes, beats, strawberries, bananas, corn, apples, pears, peaches, plums grapes, lettuce, celery, or mushrooms for example. The produce 100 can generally include a commercial crop or agricultural product harvested for human consumption.

The produce 100 can include a first portion 105 and a second portion 110. The first portion 105 can include a body or pod 115 of the produce 100, and the second portion 110 can include at least a portion of the stem 120 or the calyx 125 of the produce 100, with the pod 115 generally being the edible portion of the produce 100. The stem 120 and the calyx 125 (while perhaps being edible) are generally the portions of the produce 100 that are not eaten. For example, the stem 120 can include the portion of the produce 100 that at least partially supports the produce 100 e.g., during growth or when attached to a plant, and the calyx 125 can include sepals or other structure between the outer surface of the pod 115 and the stem 120. The calyx 125 can include a cup shaped structure that attaches the stem 120 with the pod 115 or that covers at least a portion of the pod 115.

Figure 2:
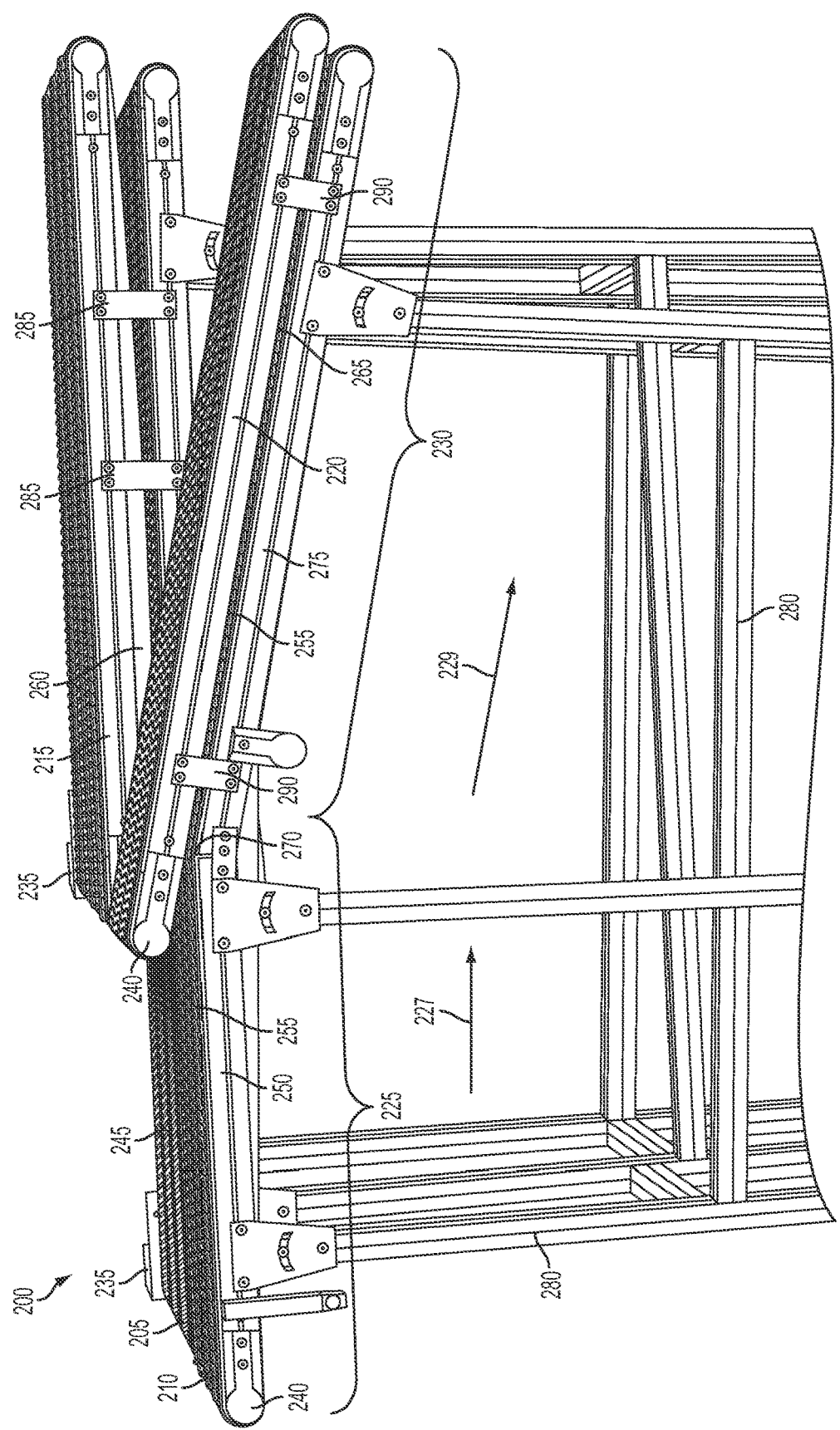
FIG. 2 is a perspective view depicting one example of a de-stemming apparatus, according to an illustrative implementation.

FIG. 2 illustrates one example of a de-stemming apparatus 200. The de-stemming apparatus 200 can separate the first portion 105 of the produce 100 from the second portion 110 of the produce 100. For example, de-stemming apparatus 200 can process the produce 100 to separate at least part of the stem 120 or the calyx 125 from the pod 115.

In some implementations, the de-stemming apparatus 200 includes at least one conveyor unit. For example, the de-stemming apparatus 200 can include at least one first conveyor unit 205, at least one second conveyor unit 210, at least one third conveyor unit 215, and at least one fourth conveyor unit 220, each of which can include at least one conveyor belt or cleated chain to accommodate the produce 100. For example, the first to fourth conveyor units 205 to 220, as well as other conveyor units such as those of the receiving unit 1010 as depicted, for example, in FIG. 10 and FIG. 15, among others, can include conveyor belts having grooves, dimples, divots, recesses, smooth surfaces, cleated surfaces, chains, ridges, treads, protrusions, or frictional elements that contact the produce 100 to convey the produce 100 (e.g., from left to right in directions of motion 227 or 229 as depicted in FIG. 2) from a first point within range 225 to a second point within range 230.

In some implementations, at least one driving unit 235 is configured to drive the first to fourth conveyor units 205 to 220. The driving units 235 can include at least one motor coupled to at least one shaft 240 connected to at least one of the first to fourth conveyor units 205 to 220. The driving units 235 can rotate the shafts 240 to drive the respective conveyor belts around the first to fourth conveyor units 205 to 220.

In one implementation, a first driving unit 235 and a first shaft 240 are coupled to the first conveyor unit 205 and the second conveyor unit 210 to drive the first conveyor unit 205 and the second conveyor unit 210. For example, the driving unit 235 and the shaft 240 can drive the first and second conveyor units 205 and 210 at a constant (e.g., +/−10%) speed. In some implementations, a second driving unit 235 and a second shaft 240 are coupled to the third conveyor unit 215 and the fourth conveyor unit 220 to drive the third conveyor unit 215 and the fourth conveyor unit 220, for example at a constant (e.g., +/−10%) speed.

In one implementation, at least one driving unit 235 operates the conveyor units (e.g., first to fourth conveyor units 205 to 220) at a same speed (e.g., within +/−10%). For example, the driving unit 235 can include an AC or DC motor to drive the first to fourth conveyor units 205 to 220 at a speed of between 0.1 and 10 feet per second. In some implementations, one driving unit 235 can drive one or more of conveyor units 205 to 220, or the conveyor units 205 to 220 can have dedicated driving units 235 that may communicate with each other for speed control, or that can be independently operated.

The de-stemming apparatus 200 can convey the produce 100 such as a pepper along a length of the de-stemming apparatus 200. In some implementations, the first conveyor unit 205 is disposed proximate to a first portion 250 of the second conveyor unit 210. For example, the first conveyor unit 205 and the first portion 250 of the second conveyor unit 210 can be coplanar. In some implementations, a top surface 245 of the first conveyor unit 205 and a top surface 255 of the first portion 250 of the second conveyor unit 210 are disposed proximate to each other so that the top surface 245 and the top surface 255 are substantially level. The first conveyor unit 205 and the first portion 250 of the second conveyor unit 210 need not be coplanar. For example, in a generally horizontal configuration of the de-stemming apparatus, as in FIG. 2, the top surface 255 can ramp upwards, relative to the top surface 245 along the direction of motion 225. For example, the top surface 255 can be substantially (e.g., +/−10%) 0.25 inches above the top surface 245 at the pivot point 270, to support the stem 120 or the second portion 110 of the produce 100 as the produce 100 approaches or enters the pivot point 270.

In one implementation, the produce 100 is disposed with at least a portion of the pod 115 (or first portion 105) contacting the top surface 245 of the first conveyor unit 205 and at least a portion of the stem 120 (or second portion 110) contacting or disposed above the top surface 255 of the second conveyor unit 210. In this example, the produce 100 overlaps both the top surface 245 of the first conveyor unit 205 and the proximate top surface 255 of the first portion 250 of the second conveyor unit 210. At least one driving unit 235 can drive the first conveyor unit 205 and the second conveyor unit 210 (e.g., at a same speed) to convey the produce 100 in the direction of motion 227 along the first conveyor unit 205 and the first portion 250 of the second conveyor unit 210. In this example, the second portion 110 of the produce 100 (e.g., the stem 120 or the calyx 125) may or may not contact the second conveyor unit 210. For example, the second portion of 110 of the produce 100 may be disposed above the top surface 255 without contacting the top surface 255, with the pod 115 or first portion 105 resting on the top surface 245 of the first conveyor unit 205.

A manual operator, produce feeder apparatus, or produce alignment apparatus (not shown in FIG. 2) can provide the produce 100 for entry into the de-stemming apparatus 200, e.g. onto the first conveyor unit 205 or the second conveyor unit 210. For example, an alignment apparatus proximate to or coupled with the de-stemming apparatus 200 can include a conveyor belt system with image recognition features to align peppers or other produce for placement into the de-stemming apparatus 200 with the first portion 105 of the produce 100 disposed on the first conveyor unit 205 and with the second portion 110 of the produce 100 disposed beyond a longitudinal edge of the first conveyor unit 205, (e.g., on or over the second conveyor unit 210). The produce 100 aligned in this manner can be conveyed by the de-stemming apparatus 200 in the direction of motion 227 passing the first point within the range 225, which may be a location or point of the de-stemming apparatus 200 that includes the first portion 250 of the second conveyor unit 210 or a corresponding proximate portion of the first conveyor unit 205. In one implementation, the produce 100 is conveyed onto the first conveyor unit 205 or the second conveyor unit 210 without an image recognition control system.

In some implementations, the de-stemming apparatus 200 conveys the produce 100 in the direction of motion 227, and at least one third conveyor unit 215 or at least one fourth conveyor unit 220 engage at least part of the produce 100. The third conveyor unit 215 and the fourth conveyor unit 220 can operate in a direction consistent with a direction of operation of the first conveyor unit 205 and the second conveyor unit 210. For example, the top surface 245 of the first conveyor unit 205 and the top surface 255 of the second conveyor unit 210 can move in the direction of motion 227 or the direction of motion 229, and a bottom surface 260 of the third conveyor unit 215 and a bottom surface 265 of the fourth conveyor unit 220 can also move in the direction of motion (or trajectory) 227 or the direction of motion (or trajectory) 229, under the control of one or more driving units 235. In this example, from the perspective of FIG. 2, the first conveyor unit 205 and the second conveyor unit 210 can operate at one speed and rotate in a clockwise direction, and the third conveyor unit 215 and the fourth conveyor unit 220 can operate at the same speed as the first and second conveyor units 205 to 210 but can rotate in a counterclockwise direction.

In some implementations, the bottom surface 260 of the third conveyor unit 215 and the top surface 245 of the first conveyor unit 205 engage a first portion 105 of the produce 100 in an opening defined between the bottom surface 260 and the top surface 245. For example, the first conveyor unit 205 and the third conveyor unit 215 can convey the pod 115 in the direction of motion 227. In this example, contact or compression force between the first conveyor unit 205 and the third conveyor unit 215 can hold the pod 115 in a fixed position as the produce 100 is conveyed in a trajectory along a longitudinal length of the de-stemming apparatus 100 in a space defined between the third conveyor unit 215 and the first conveyor unit 205. In this example, the pod 115 (or other first portion 105) of the produce 100 can be pinched or fixed in position between the first conveyor unit 205 and the third conveyor unit 215 with compression force sufficient to hold the pod 115 in a fixed position during conveyance from the first point of the de-stemming apparatus 200 (a location within the range of first points 225) through a second point of the de-stemming apparatus 200 (a location within the range of second points 230).

In some implementations, the second conveyor unit 210 and the fourth conveyor unit 220 can engage the second portion 110 of the produce 100. For example, the bottom surface 265 of the fourth conveyor unit 220 and the top surface 255 of the second conveyor unit 210 can engage at least part of the stem 120 and compression force from the engagement applied to the stem 120 holds the stem 120 in a fixed or substantially fixed position during conveyance in the direction of motion 229 in a space defined between the bottom surface 265 and the top surface 255. In one implementation, the point of engagement of the pod 115 with the first conveyor unit 205 and the third conveyor unit 215 occurs at a point of the de-stemming apparatus 200 within the range 225 or at a pivot point 270. The point of engagement of the stem 120 with the second conveyor unit 210 and the fourth conveyor unit 220 can also occur at a point of the de-stemming apparatus 200 within the range 225 or at the pivot point 270.

In some implementations, the de-stemming apparatus 200 engages two different portions of one item of produce 100, such as a pepper. For example, the first conveyor unit 205 together with the third conveyor unit 215 can engage the first portion 105 (e.g., the pod 115) of the item of produce 100, and the second conveyor unit 210 together with the fourth conveyor unit 220 can engage the second portion 110 (e.g., the stem 120) of the item of produce. In one implementation, the two engagements occur substantially simultaneously. For example, the de-stemming apparatus 200 can engage the first portion 105 and second portion 110 of the item of produce 100 within a distance of three inches or less of conveyance in the direction of motion 227, direction of motion 229, or a combination of both directions of motion 227, 229. In some implementations, the de-stemming apparatus 200 engages the pod 115 (or first portion 105 of the produce 100) and the stem 120 (or the second portion 110) sequentially, (e.g., with the pod 115 engaged first, and with the stem subsequently engaged after three or more inches of produce conveyance in the direction of motion 227, direction of motion 229, or a combination thereof). The directions of motion 227 and the direction of motion 229 can be linear directions of motion.

In some implementations, the de-stemming apparatus 200 conveys the first portion 105 of the item of produce 100 along a first trajectory in a first direction, such as the direction of motion 227, and conveys the second portion 110 of the same item of produce 100 along a second trajectory in a second direction, such as the direction of motion 229. The two trajectories can differ with respect to each other by between zero and 90 degrees.

For example, first conveyor unit 205 can convey an item of produce 100 toward the third conveyor unit 215 in the direction of motion 227. This can bring the first portion 105 of the produce 100 (e.g., the pod 115) into contact with the third conveyor unit 215. The first portion 105 continues conveyance into the space or opening between the top surface 245 of the first conveyor unit 205 and the bottom surface 260 of the third conveyor unit 215. This conveyance applies a compression force to the first portion 105 of the produce 100 sufficient to hold the first portion 105 in a fixed position in the direction of motion 227. In some implementations, with the first portion 105 of the produce 100 held in position between the first conveyor unit 205 and the third conveyor unit 215, at least one driving unit 235 continues to move the conveyor units 205, 215 to convey the first portion in the direction of motion 227.

Continuing with this example, the first portion 250 of the second conveyor unit 210 can convey or travel with the same item of produce 100 toward the fourth conveyor unit 220 in the direction of motion 227. The second portion 110 of the produce 100 (e.g., the stem 120) is brought into contact with the fourth conveyor unit 220. The second portion 110 continues conveyance into the space or opening between the top surface 255 of the second conveyor unit 210 and the bottom surface 265 of the fourth conveyor unit 220. This conveyance applies a compression force to the second portion 110 of the produce 100 sufficient to hold the second portion 110 in a fixed position in the direction of motion 229.

In one implementation, the second portion 110 of the produce 100 (e.g., the stem 120) engages the fourth conveyor unit 220 at or proximate to the pivot point 270 between the first portion 250 and a second portion 275 of the second conveyor unit 210. The pivot point 270 can define an angle from greater than zero to 90 degrees between the first portion 250 of the second conveyor unit 210 (or the first conveyor unit 205) and the second portion 275 of the second conveyor unit 210.

Thus, different portions of the de-stemming apparatus 200 can engage different portions of the produce 100 and can convey the different portions of the produce along different trajectories that diverge from each other. In some implementations, the divergence creates a separation force between the first portion 105 and the second portion 110 of the produce 100. For example, the first conveyor unit 205 and the third conveyor unit 215 can engage the pod 115 in the opening between these two conveyor units 205, 215 with compression force that holds the pod 115 in a fixed position (e.g., without substantially puncturing, tearing, or disfiguring the pod 115) while conveying the pod 115 along the trajectory of the direction of motion 227. In one implementation, the size of the opening substantially matches (e.g., is the same to 10% less than) the maximum diameter of the pod 115, e.g., less than three inches, or less than two inches for example.

The second conveyor unit 210 and the fourth conveyor unit 220 can engage the stem 120 of the same item of produce 100 in the opening between these two conveyor units 210, 220 with compression force that holds the stem 120 in a fixed position while conveying the stem along the trajectory of the direction of motion 229. In one implementation, the size of the opening substantially matches (e.g., is the same to 10% less than) the maximum diameter of the stem 120, e.g., less than 0.25 inches for example. In one implementation, the stem 120 (or other second portion 110) is pinched between the second conveyor unit 210 and the fourth conveyor unit 220 so that, for example, the conveyor belts of the conveyor units 210, 220 contact each other on lateral sides of the stem 120 such as before and after the area where the stem 120 is disposed, or between consecutive stems 120.

In some implementations, conveyance by the de-stemming apparatus 200 of the produce 100 along these diverging trajectories creates a separation force that separates the first portion 105 of the item of produce 100 from the second portion 110 of the same item of produce. For example, the second portion 275 of the second conveyor unit 210 can be disposed at an angle of between zero and 60 degrees relative to the first conveyor unit 205, or relative to the first portion 250 of the second conveyor unit 210, so that the divergence between trajectories is between zero and 60 degrees in this example.

The separation force generated by conveying different portions of the produce 100 along different trajectories can pull or peel the produce 100 apart between the first portion 105 and the second portion 110. For example, due to the separation force, the de-stemming apparatus 200 can peel at least a portion of the stem 120 or the calyx 125 from the pod 115. In this example, the stem 120 and the calyx 125 can remain attached to each other and be separated from the pod 115, with the pod 115 intact (e.g., without cut, puncture, or rupture wounds that penetrate into the item of produce 100 or into any internal cavities of the produce 100). In this example, it is the separation force, and not a cutting blade, water jet, air blade (e.g., concentrated air flow), or separation obstacle (e.g., a post, wall, or blocker) that separates the first portion 105 from the second portion 110.

Once separated, the first portion 105 of the item of produce 100 can remain held in position between the first and third conveyor units 205 and 215 during continued conveyance of the first portion 105 in the direction of motion 227, and the second portion 110 of the produce 100 can remain held in position between the second and fourth conveyor units 210 and 220 during continued conveyance of the second portion 110 in the direction of motion 229 until the first portion 105 and the second portion 110 are expelled or released from the de-stemming apparatus 200, further conveyed, or deposited into one or more receptacles for further processing, transport, quality control, disposal, or recycling.

The separation of the first portion 105 and the second portion 110 of the item of produce 100 can occur between two points of the de-stemming apparatus 200. For example, the first point of the de-stemming apparatus 220 can be a point during which both the first portion 105 and the second portion 110 are conveyed in the direction of motion 227. At this point, the item of produce 100 includes both first portion 105 and the second portion 110, which are attached to each other. For example, the stem 120 and the calyx 125 are attached to the pod 115 of the pepper 100. In one implementation, the first point is a point along the range 225 of the de-stemming apparatus 200, a point of the de-stemming apparatus 200 that includes the first portion 250 of the second conveyor unit 210, or a point at or proximate to the pivot point 270.

Continuing with this example, the second point of the de-stemming apparatus 200 can be a point by which the first portion 105 and the second portion 110 are separated from each other. In one example, at the second point, the first portion 105 (e.g., the pod 115) is conveyed in the direction of motion 227, and the second portion 110 (e.g., the stem 120 and the calyx 125) are conveyed in the direction of motion 229. The separation of the first portion 105 from the second portion 110 can occur or be completed at or prior to conveyance past the second point of the de-stemming apparatus 200. In one implementation, the second point is a point along the range 230 of the de-stemming apparatus 200, or a point of the de-stemming apparatus 200 that includes the second portion 275 of the second conveyor unit 210. In some implementations, the first point is within the range 225 and the second point is within the range 230.

In some implementations, the de-stemming apparatus 200 includes at least one mounting structure 280. The mounting structure 280 can include a plurality of legs, beams, tables, platforms, or support members connected to or configured to support at least one of the conveyor units 205 to 220.

The conveyor units 205 to 220 can have various dimensions. In some implementations, the first conveyor unit 205 is 10 inches or less in width, and 24 inches or longer in length. In one implementation, the second conveyor unit 210 is 6 inches or less in width, the first portion 250 is at least 12 inches in length and the second portion 275 is also at least 12 inches in length. The first and second conveyor units 205, 210 can also be several feet in length, or longer depending for example on whether or not the de-stemming apparatus 200 is fixed or portable, or constructed for low or high volume produce processing. In some implementations, the third conveyor unit 215 is substantially the same width (e.g., +/−10%) and shorter in length that the first conveyor unit 205, and the fourth conveyor unit 220 is substantially the same width (e.g., +/−10%) and shorter in length that the second conveyor unit 210. In one implementation, the fourth conveyor unit 220 is less than half of the length of the second conveyor unit 210. The third conveyor unit 215 can also be less than half the length of the first conveyor unit 205.

In some implementations, at least one bracket or connecting member 285 couples the first conveyor unit 205 with the third conveyor unit 215. For example, at least one connecting member 285 can fix the third conveyor unit 215 in position above (from the perspective of FIG. 2) at least a portion of the first conveyor unit 205. In this example, the connecting members 285 position the bottom surface 260 of the third conveyor unit 215 parallel to the top surface 245 of the first conveyor unit 205 with an opening (e.g. for the pod 115) between the bottom surface 260 and the top surface 245. In one implementation this opening is less than three inches.

The de-stemming apparatus 200 can also include at least one bracket or connecting member 290 to couple the second conveyor unit 210 with the fourth conveyor unit 220. For example, at least one connecting member 290 can fix the fourth conveyor unit 220 in position above (from the perspective of FIG. 2) at least a portion of the second conveyor unit 210. In this example, the connecting members 290 position the bottom surface 265 of the fourth conveyor unit 220 parallel to the top surface 255 of the second portion 275 of the second conveyor unit 210 with an opening (e.g. for the stem 120) between the bottom surface 265 and the top surface 255. In one implementation this opening is less than 0.25 inches.

Figure 3:
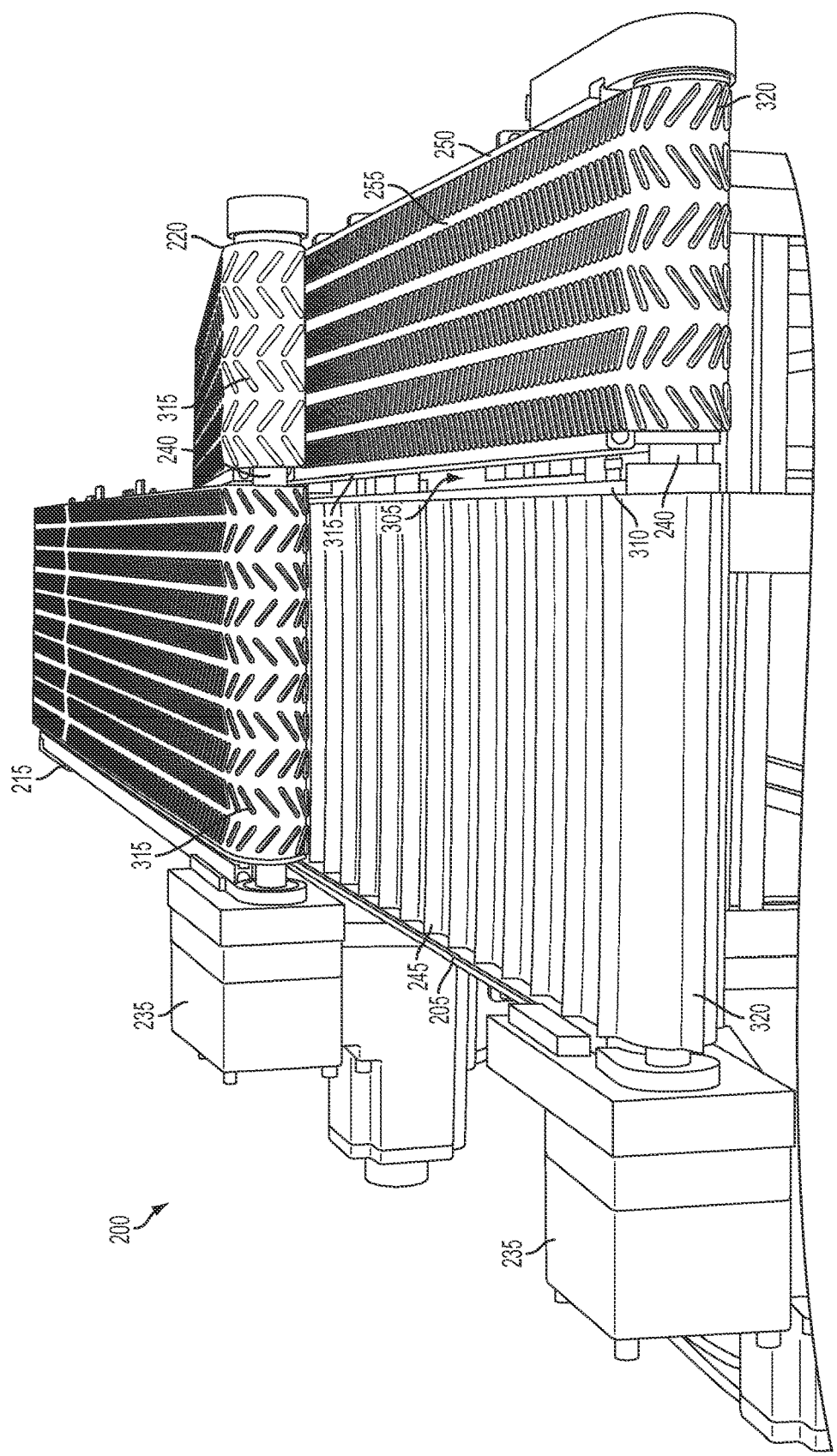
FIG. 3 is a perspective view depicting one example of a de-stemming apparatus, according to an illustrative implementation.
Figure 4:
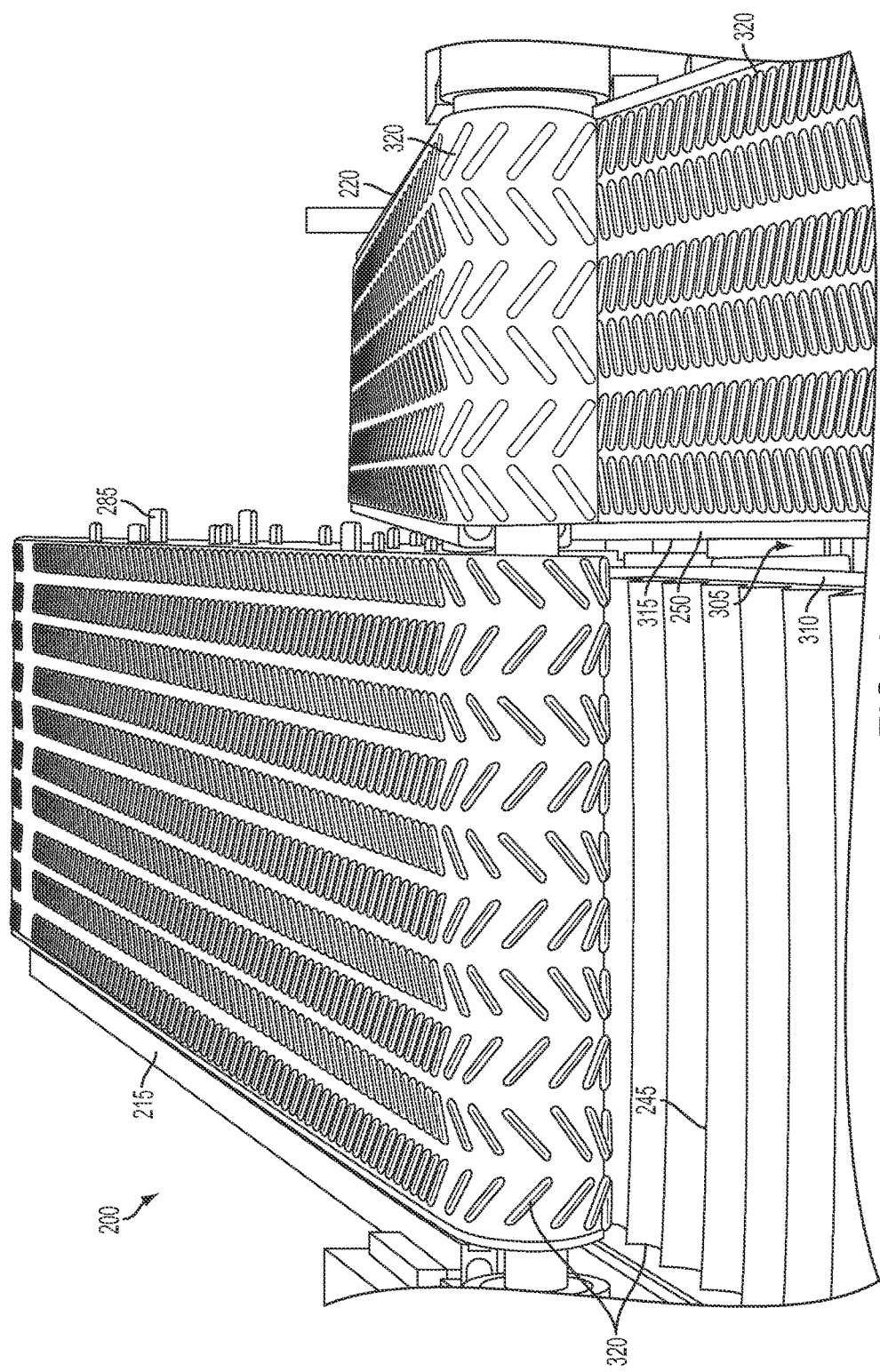
FIG. 4 is a perspective view depicting one example of a de-stemming apparatus, according to an illustrative implementation.

FIG. 3 and FIG. 4 illustrate examples of a de-stemming apparatus 200 from a front longitudinal perspective where the produce 100 (not shown in FIGS. 3 and 4) is fed into the de-stemming apparatus 200 in the foreground, for example with the pod 115 disposed on the top surface 245 of the first conveyor unit 205. In this example, the driving unit 235 that is attached to the first conveyor unit 205 drives the shaft 240 to rotate the first conveyor unit 205 and the second conveyor unit 210. The rotation can carry the produce 100 on the top surface 245 toward the third conveyor unit 215 and the fourth conveyor unit 220.

The de-stemming apparatus 200 can include a gap 305 between the first conveyor unit 205 and the second conveyor unit 210, (the first portion 250 of which is visible in the examples of FIGS. 3 and 4). For example, the gap 305 can include a space defined by an edge 310 of the first conveyor unit 205 and an edge 315 of the second conveyor unit 210. In some implementations, the edge 310 and the edge 315 are proximate edges of their respective conveyor units that define the gap 305 as a substantially parallel opening between the first conveyor unit 205 and the second conveyor unit 210. The conveyor belts of the conveyor units 205 to 220 can extend to, or within 0.25 inches of their respective edges.

Referring to FIGS. 1-4, among others, the gap 305 can have a length (e.g., along the longitudinal axis of the de-stemming apparatus 200) that is substantially the same length as the length of the first portion 250 of the second conveyor unit 210. The width of the gap 305 can define the distance between the first conveyor unit 205 and the adjacent or proximate first portion 250 of the second conveyor unit 210. In some implementations, the width of the gap 305 is between 0.25 and 3 inches. The width of the gap 305 can be less than the length of the second portion 110 of the produce 100 that the de-stemming apparatus 200 processes. In one implementation, the width of the gap 305 is less than the length of the stem 120 of the produce 100. In some implementations, the top surface 255 can be substantially 0.25 inches higher than the top surface 245, or the first portion 250 of the second conveyor unit 210 can be substantially 0.25 inches higher than the first conveyor unit 205. A bar or runner can be disposed along the gap 305. For example, the bar can be substantially (e.g., +/−10%) 0.25 inches in height and width at the beginning of the gap 305, (e.g., the foreground as in FIG. 3, or proximate to the shaft 240), and can taper off to be substantially level or coplanar with the top surface 255 at the pivot point 270.

In some implementations, the produce 100 crosses over the gap 305. For example, all or substantially all of the first portion 105 of the produce 100 can be disposed on the top surface 245 of the first conveyor unit 205, and at least some of the second portion 110 of the produce 100 can be disposed on (e.g., resting on) or above the top surface 255 of the second conveyor unit 210, (e.g., the top surface of the first portion 250 of the second conveyor unit 210). The portion of the produce over the gap 305 can include parts of the pod 115, the stem 120 or the calyx 125 for example. In one implementation, during processing, (e.g., a de-stemming operation performed by the de-stemming apparatus 200) the produce 100 is aligned on the de-stemming apparatus 200 with at least 75% of the first portion 105 on or above the top surface 245 of the first conveyor unit and with at least 10% of the second portion 110 on or above the second conveyor unit 210. The remaining portion of the produce 100 can be disposed over the gap 305 in this example.

Conveyor belts of the first to fourth conveyor units 205 to 220 can include treads 320 on their outer surfaces. For example, the conveyor belt of the first conveyor unit 205 can include treads 320 in the form of spaced apart parallel walls or ridges that protrude out, or upwards, from the conveyor belt to accommodate the produce 100. The treads 320 can include various shapes or patterns, such as walls, tread patterns, wave patterns, or serpentine patterns. In one implementations, the treads 320 of the first conveyor unit 205 or the third conveyor unit 215 accommodate the first portion 105 (e.g., the pod 115) of the produce 100, and the treads 320 of the second conveyor unit 210 or the fourth conveyor unit 220 accommodate the second portion (e.g., including the stem 120) of the produce 100.

In one implementation, the treads 320 of the first conveyor unit 205 have a pattern that is different than the treads 320 of the second conveyor unit 210, the third conveyor unit 215, and the fourth conveyor unit 220. For example, the treads 320 of the first conveyor unit 205 can include a series of parallel walls, where a recess between two successive parallel walls accommodates a single item of produce 100, (e.g., a single pod 115 can be disposed between two consecutive walls). The treads 320 of the second conveyor unit 210, third conveyor unit 215, and fourth conveyor unit 220 can have different shapes, sizes or patterns. In some implementations, the treads 320 of the first conveyor unit 205 are configured to interact with the treads 320 of the third conveyor unit 215. For example, the treads 320 of the first conveyor unit 205 can include protrusions, and the treads 320 of the third conveyor unit 215 can include depressions or recesses. The treads 320 of the respective conveyor units can align to secure at least a portion of the produce 100 in a fixed position during conveyance through the de-stemming apparatus 200. The treads 320 of the second conveyor unit 210 and the fourth conveyor unit 220 can also align with each other during operation of the de-stemming apparatus 200.

Figure 5:
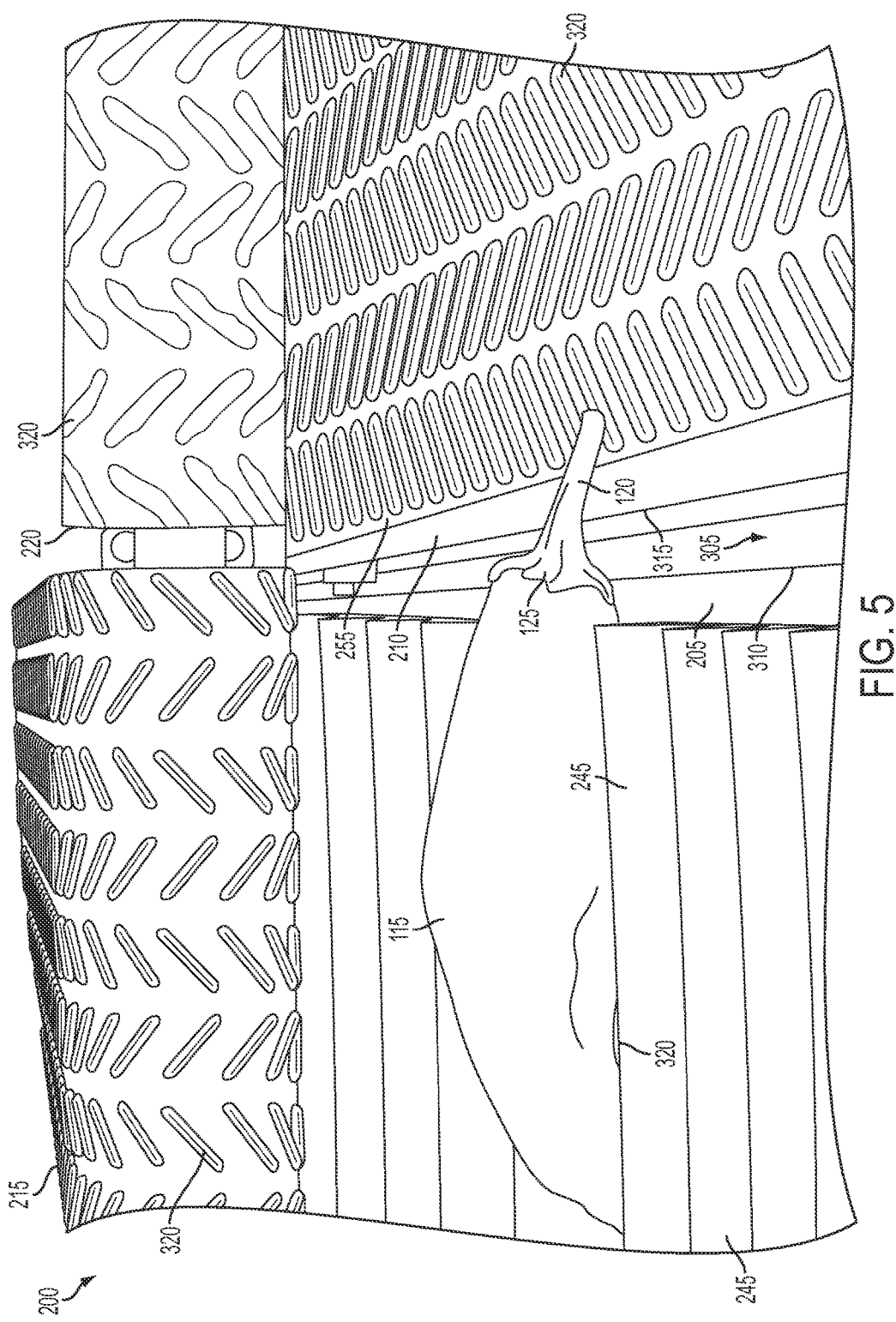
FIG. 5 is a perspective view depicting one example of a de-stemming apparatus, according to an illustrative implementation.

FIG. 5 illustrates one example of a de-stemming apparatus 200 from a front longitudinal perspective where the produce 100 is fed into the de-stemming apparatus 200. In one implementation, the majority of the pod 115 is disposed on the top surface 245, for example between consecutive treads 320, with the calyx 125 generally positioned over the gap 305, and with the stem 120 crossing the gap 305 over the second conveyor unit 210, with at least a portion of the stem 120 on or over the top surface 255 of the second conveyor unit 210. In one implementation, at least the first conveyor unit 205 and the second conveyor unit 210 are in motion to convey the produce 100 toward the third conveyor unit 215 and the fourth conveyor unit 220, which can also be in motion to engage the produce 100 when at least a portion of the produce 100 is brought into contact with the third conveyor unit 215 or the fourth conveyor unit 220.

Figure 6:
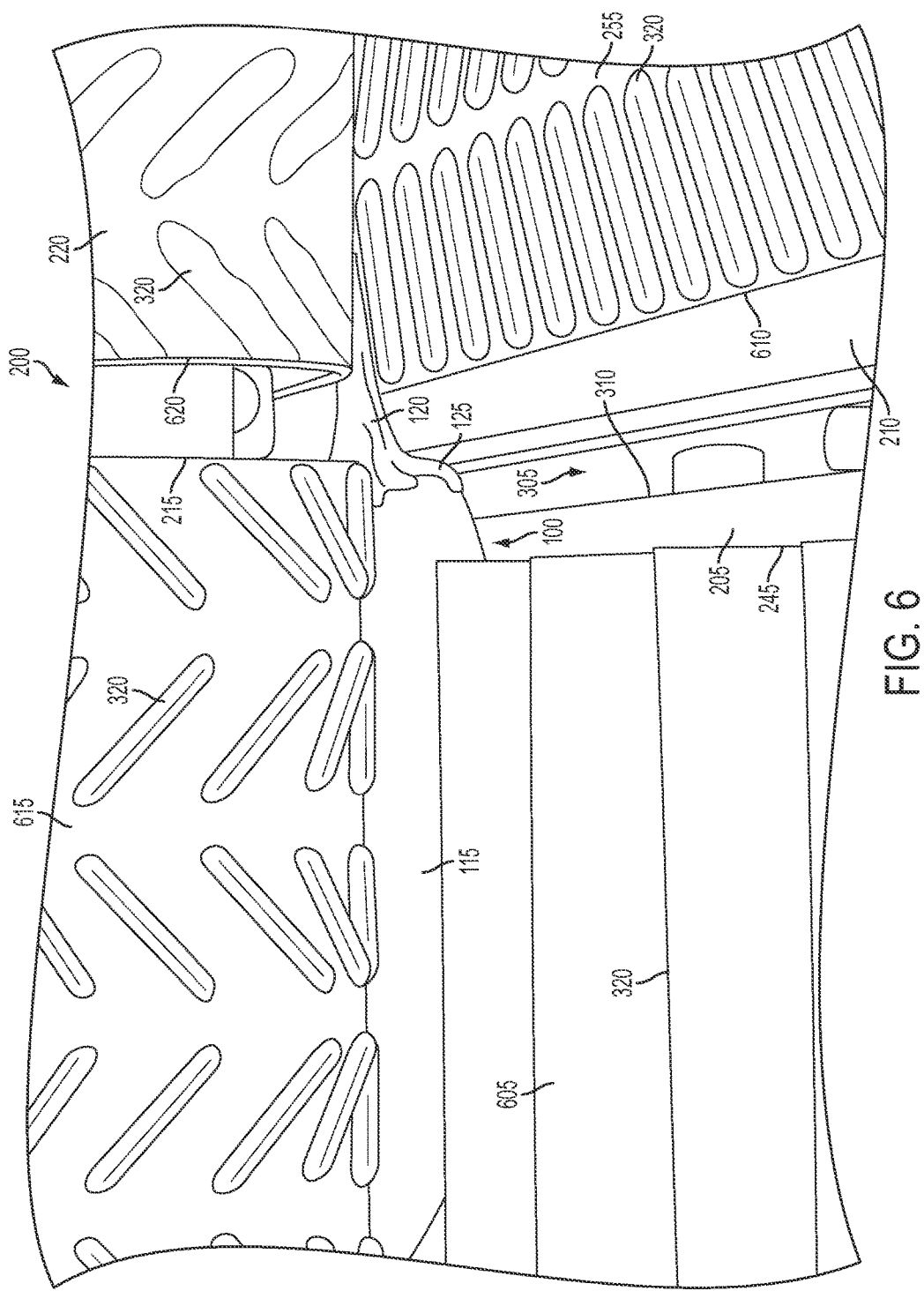
FIG. 6 is a perspective view depicting one example of a de-stemming apparatus, according to an illustrative implementation.

FIG. 6 illustrates one example of a de-stemming apparatus 200 where the produce 100 is fed into the de-stemming apparatus 200. In one implementation, each of the first conveyor unit 205, the second conveyor unit 210, the third conveyor unit 215, and the fourth conveyor unit 220 are in motion (e.g., under the control of at least one driving unit 235) at the same or substantially the same speed (e.g., +/−10%). The speed can range from 0.1 to 10 feet per second, for example.

During operation of the de-stemming apparatus 200 the conveyor belt 605 of the first conveyor unit 205 can carry the produce 100 with the pod 115 disposed on the top surface 245. The third conveyor unit 215 together with the first conveyor unit 205 can engage part of the produce 100, such as the pod 115, and the fourth conveyor unit 220 can engage a different part of the produce 100, such as the stem 120. In this example and referring to FIGS. 1-6, among others, with the four conveyor units in motion, the first conveyor unit 205 and the third conveyor unit 215 can hold at least a portion of the pod 115 (or other first portion 105) of an item of produce generally fixed in position (e.g., during conveyance in the direction of motion 227). Continuing with this example, the second conveyor unit 210 and the fourth conveyor unit 220 can hold at least a portion of the stem 120 (or other second portion 110) of the same item of produce 100 generally fixed in position.

In this example, the different components (e.g., pod 115, stem 120) of the produce 100 can be held in a their positions during conveyance through at least part of the de-stemming apparatus 200 by the conveyor belt 605 of the first conveyor unit 205, a conveyor belt 610 of the second conveyor unit 210, a conveying belt 615 of the third conveyor unit 215, and a conveying belt 620 of the fourth conveyor unit 220.

In one implementation, during engagement with the stem 120, the produce 100 is traveling in a first trajectory, e.g., the direction of motion 227. As motion continues, the produce 100 can pass the pivot point 270 between the first portion 250 and the second portion 275 of the second conveyor unit 210. When the produce 100 passes the pivot point 270, at least a portion of the stem 120 (or other second portion 110 of the produce 100) begins conveyance along a different second trajectory, e.g., the direction of motion 229. From the pivot point 270, the two trajectories can diverge from each other by between zero and 90 degrees. In one implementation, this divergence is between 10 and 45 degrees. A portion of the produce 100 can extend across the gap 305.

During continued conveyance through the de-stemming apparatus 200, the angular displacement between the trajectory of the portion of the pod 115 held in place by the first conveyor unit 205 and the third conveyor unit 215 (e.g., travelling in direction 227) and the portion of the stem 120 held in place by the second conveyor unit 210 and the fourth conveyor unit 220 (e.g., travelling in direction 229) generates a separation force between the stem 120 and the pod 115. In some implementations, the separation force peels at least some of the stem 120 and the calyx 125 (or other part of a second portion 110 of the produce 100) from the pod 115 (or other part of the first portion 105 of the produce 100).

With sufficient distance (e.g., between 0.5 and 24 inches) of continued conveyance of the produce 100 in diverging directions, at least part of the second portion 110 separates from the remainder of the produce 100. The distance the produce 100 travels between a first point where it is held in position (e.g., a point of initial engagement within the range 225, along the length of the first portion 250 of the second conveyor unit 210, or at or proximate to the pivot point 270) and a second point where separation is complete (e.g., within the range 230, along the length of the second portion 275 of the second conveyor unit 210, or downstream from the pivot point 270) varies with the angle, or degree of divergence, between the first and third conveyor units (travelling in a first direction) and the second and fourth conveyor units (travelling in a second direction). The angle can vary between zero and 90 degrees. In some implementations the separation occurs within 18 inches from the pivot point 270 where the pod 115 trajectory and the stem 120 trajectory begin to diverge.

Figure 7:
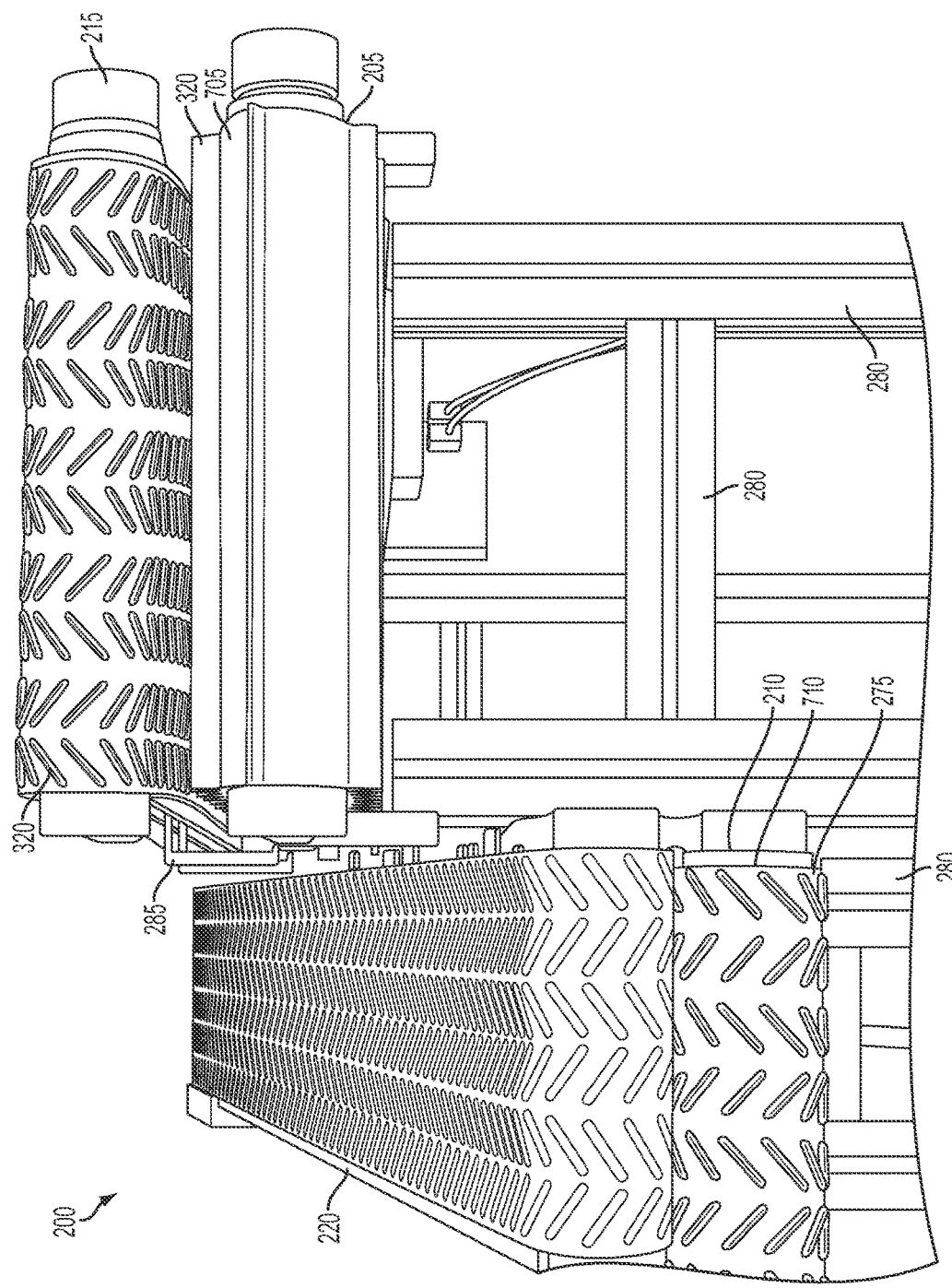
FIG. 7 is a perspective view depicting one example of a de-stemming apparatus, according to an illustrative implementation.

FIG. 7 illustrates one example of a de-stemming apparatus 200 from a rear perspective, for example where the produce 100 is expelled from the de-stemming apparatus 200. With reference to FIGS. 1-7, among others, the first conveyor unit 205 and the third conveyor unit 215 can convey the first portion 105 of the produce 100 (e.g., the pod 115) in a first trajectory (e.g., the direction of motion 227), and the second portion 275 of the second conveyor unit 210 and the fourth conveyor unit 220 convey can convey the produce 100 in a second trajectory (e.g., the direction of motion 229). Conveyance in these diverging paths can generate a separation force between at least a portion of the stem 120 and the remainder of the produce 100. The separation force can separate or peel (e.g., in a peeling motion or manner) at least a portion of the stem 120 apart from the remainder of the produce 100. For example, the stem 120 and the calyx 125 can be separated from the pod 115.

In some implementations, the first portion 105 of the produce 100 can be expelled from the de-stemming apparatus 200 due for example to gravitational forces when the first portion 105 is conveyed by at least the first conveyor unit 205 beyond the end portion 705 of the first conveyor unit 205. For example, the pod 115 can fall into a box or onto another conveyor unit for further processing, quality assessment, cleaning, packaging, or distribution. In some implementations, rather than falling from the end portion 705, the first conveyor unit of another conveyor unit or apparatus can continue to transport or carry the first portion 105 for further processing, quality assessment, cleaning, packaging, or distribution. In one implementation, a worker can manually remove the first portion 105 from the de-stemming apparatus 200 subsequent to separation of at least part of the second portion 110 from the first portion 105.

The second portion 110 or portion thereof can be expelled from the de-stemming apparatus 200 due to conveyance beyond the edge 710 of the second conveyor unit 210. For example, at least a portion of the stem 120 or the calyx 125 can fall into a box for onto another conveyor unit, or can continue to be conveyed by at least the conveyor unit 210 for further processing, recycling, or disposal.

Figure 8:
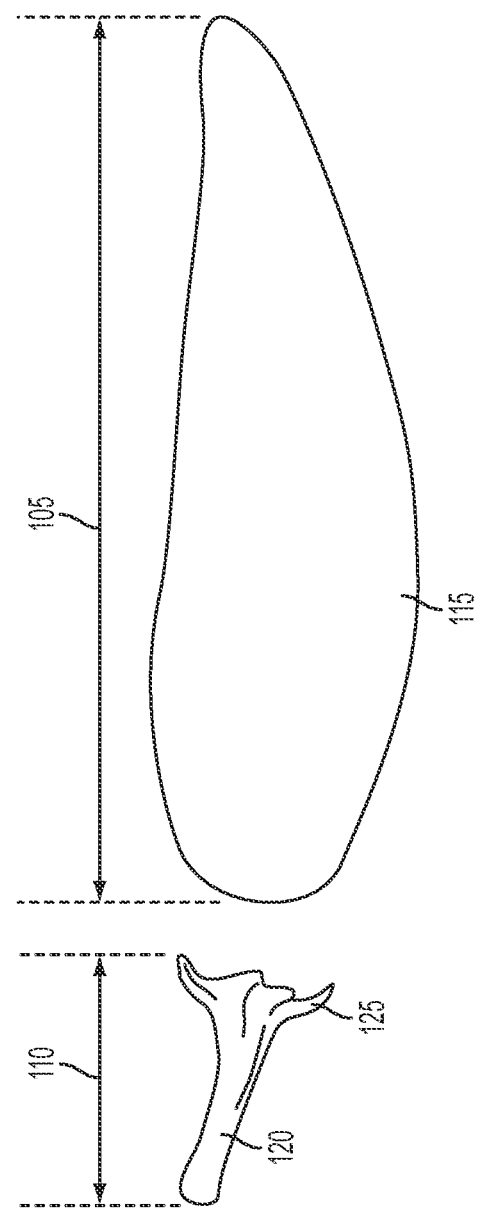
FIG. 8 is an illustration depicting one example of an item of produce, according to an illustrative implementation.

FIG. 8 illustrates one example of the produce 100 subsequent to separation of the second portion 110 from the first portion 105 by the de-stemming apparatus 200. In one implementation, the de-stemming apparatus 200 separates at least part of the second portion 110 from the remainder of the produce 100. For example, all or part of the stem 120 and the calyx 125 can be separated from the body or pod 115. In some implementations, the pod 115 remains substantially intact after separation from the stem 120 or calyx 125. For example, due to the peeling motion the pod 115 (or other first portion 105 of an item of produce 100) can be substantially free of punctures, tears, penetrations, or cut marks. In one implementation, the peeling motion that occurs due to the separation force causes separation between the calyx 125 and the pod 115. In some implementations, the separation force causes separation between at least part of the stem 115 and the remainder of the produce 100. In one implementation the produce 100 may have a minimal or no calyx 125, and the separation can occur between the stem 120 and the pod 115.

In some implementations, each of the first to fourth conveyor units 205-220 (e.g., all four) can be in simultaneous motion. The conveyor units 205-220 can be driven by the same or different driving units 235, and one driving unit 235 can drive one or more of conveyor units 235 at the same speed (e.g., within +/−10%). In one implementation, one driving unit 235 drives each of the four conveyor units 205-220. In some implementations, the four conveyor units 205-220 are different parts of one conveyor unit. For example, the de-stemming apparatus 200 can have more or less than four conveyor belts or more or less than four conveyor units. One conveyor belt can convey the produce 100 along more than one conveyor unit. In one implementation, at least one of the conveyor units 205-220 can be passive, e.g., not actively driven by the driving unit 235. For example, the third conveyor unit 215 or the fourth conveyor unit 220 can include rollers or bearings that are not driven by any of the driving units 235 that can rotate or spin to allow at least a portion of the produce 100 to pass.

In some implementations, the produce 100 can be fed into the de-stemming apparatus 200 at, or proximate to, the pivot point 270. In this example, the produce 100 enters the de-stemming apparatus 200 in a fixed or substantially fixed position with the produce engaged on multiple sides (e.g., on the bottom by the first conveyor unit 205 or the second conveyor unit 210) and on the top (e.g., by the third conveyor unit 215 or the fourth conveyor unit 220). In one implementation, the produce 100 can be initially conveyed with only bottom support for the produce 100 and with the produce 100 being in a loose or non-fixed position prior to engagement, proximate, or prior to the pivot point 270.

The de-stemming apparatus 200 can de-stem produce 100 in a low or high volume environment. For example, the de-stemming apparatus 200 can be part of a volume production plant in an assembly line type environment where a high volume of produce 100 (e.g., between 500 and 2500 pounds of produce per hour) is de-stemmed by the de-stemming apparatus 200. The de-stemming apparatus 200 can also be a portable or semi-portable unit that can be set up outside a factory or mass production environment, such as outside in a field or farm sufficiently close to a crop so that a harvester (or harvesting machine) can pick the produce 100 and feed the produce 100 to the de-stemming apparatus, e.g., by manually or automatically placing the first portion 105 of the produce 100 on the top surface 245 of the first conveyor unit 205. The de-stemming apparatus 200 can process multiple items of produce 100 simultaneously, with different items of produce 100 in different stages of the de-stemming process during sequential conveyance through the de-stemming apparatus 200.

Figure 9:
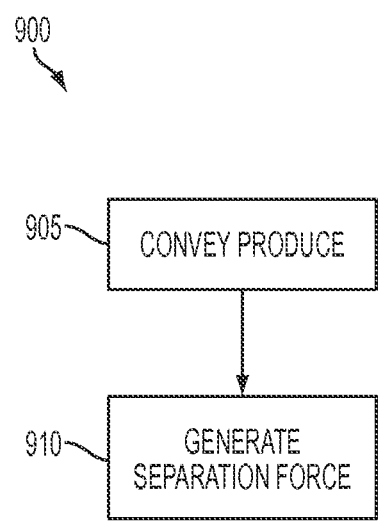
FIG. 9 is a flow diagram illustrating a method of processing produce, according to an illustrative implementation.

FIG. 9 illustrates a flow diagram illustrating a method 900 of processing produce, according to an illustrative implementation. The method 900 includes at least one act of conveying produce (ACT 905). In some implementations the produce is conveyed (ACT 905) through a de-stemming apparatus from a first point to or through a second point. The method 900 can convey, for example using the de-stemming apparatus, produce having a first portion (e.g. a pod) and a second portion (e.g., a stem) at a constant speed. During conveyance (ACT 905) between the first point and the second point, the first portion of the produce can be fixed in a first trajectory. For example, at least part of the first portion of the produce can be held in place by one or more conveyor units. The second portion of the produce can be fixed in a second trajectory during conveyance (ACT 905) between the first and second points. In some implementations, the second trajectory can deviate from the first trajectory by an angle of between greater than zero and less than 90 degrees. For example, the deviation can be greater than zero and less than 45 degrees, or less than 25 degrees. In one implementation, the produce can be conveyed (ACT 905) between the first and second points at a constant speed (e.g., +/−10%). The first and second trajectories can be linear.

The method 900 can include at least one act of generating a separation force (ACT 910). The separation force can be applied between the first portion and second portions of the produce. For example, the separation force can be applied to the stem or pod of the produce to separate at least a portion of the stem from the remainder of the produce (e.g., from the pod).

In one implementation, the method 900 generates the separation force (ACT 910) by conveying the pod in a first trajectory and by conveying the stem in a second trajectory that deviates from the first trajectory. For example, the pod (or other first portion of produce) can be conveyed in the first trajectory by at least a first conveyor unit, and the stem (or other second portion of produce) can be conveyed in the second trajectory by at least a second conveyor unit. At least one driving unit can drive the first and second conveyor units at the same or substantially the same speed, (e.g., within 10%) during conveyance in the different trajectories, such as between a first point (e.g., the pivot point) and a second point where there the separation is complete.

The de-stemming apparatus 200 can be part of a system or apparatus for processing produce that includes a produce alignment apparatus to align the produce 100 on the de-stemming apparatus 200. For example, FIG. 10 and FIG. 15, among others, depict an example produce processing system (or apparatus) 1000. The processing system 1000 can include at least one sizing unit 1005, at least one receiving unit 1010, and at least one de-stemming apparatus 200.

The sizing unit 1005 can convey the produce 100 in a first direction, e.g., the direction of motion 1015. The sizing unit 1005 can be supported by at least one frame 1007. The sizing unit 1005 can align the produce 100 vertically, along a longitudinal axis of the produce, and can release or drop the produce 100 onto the receiving unit 1010. The receiving unit 1010 can convey the produce 100 in a second direction, e.g., the direction of motion 1020. The direction of motion 1020 can be perpendicular or substantially perpendicular (e.g., +/−10%) from the direction of motion 1015. The receiving unit 1010 can include at least one produce receptacle 1025. The produce receptacle 1025 can have a cavity or open space to catch or receive the produce 100 subsequent to release of the produce 100 from the sizing unit 1005. For example, the produce 100 can be positioned with the first portion 105 of the produce 100 at least partially disposed in the cavity of the produce receptacle 1025, and with the second portion 110 of the produce 100 at least partially protruding from the cavity of the produce receptacle 1025. In some implementations, the receiving unit 1010 extends or passes through at least one opening 1030 of the sizing unit 1005. The produce receptacle 1025 can be configured to receive the produce 100. For example, the produce receptacle 1025 can be oriented in a position with the open cavity facing up, toward the top surface 1115 of the sizing unit 1005 when the produce receptacle 1025 passes through the opening 1030 of the sizing unit 1005.

The produce receptacle 1025 can convey the produce 100 in the direction of motion 1020 to an end portion 1035 where rotation of the produce receptacle 1025 around the end portion 1035 causes the produce to expel or release the produce 100 from the cavity of the produce receptacle 1025 onto the de-stemming apparatus 200. For example, at least part of the produce 100 can land on the first conveyor unit 205, e.g., directly or via an intervening conveyor unit operating in the direction of motion 1020. In some implementations, at least part of the first portion 105 of the produce 100 is expelled from the produce receptacle 1025 and arrives on the top surface 245 of the first conveyor unit 205.

The de-stemming apparatus 200 can convey the produce 100 in a third direction, e.g., the direction of motion 227, for example to separate the first portion 105 of the produce 100 from the second portion 110 of the produce 100 via engagement with at least one additional conveyor unit such as the second conveyor unit 210, the third conveyor unit 215, or the fourth conveyor unit 220 of the de-stemming apparatus 200. In some implementations, the de-stemming apparatus 200 includes at least one alignment unit such as the alignment element 1040. The alignment element 1040 can include a structural component disposed over the top surface 245 of the first conveyor unit 205, for example without touching the top surface 245. The produce 100 conveyed in the direction of motion 227 can contact the alignment element 1040.

Continued conveyance of the top surface 245 in the direction of motion 227 with the produce 100 on the top surface 245 and also at least partially contacting the alignment element 1040 can position the produce 100 for engagement by at least one additional conveyor unit, such as the third conveyor unit 215 or the fourth conveyor unit 220. The alignment element 1040 can be metal, plastic, or wood, for example, and can have various shapes, such as triangular or quadrilateral. The alignment element 1040 can also be or include at least one brush, sweeping mechanism, or blocker configured for contact with the produce 100 and to align the produce 100 to receive a separation force.

Figure 11:
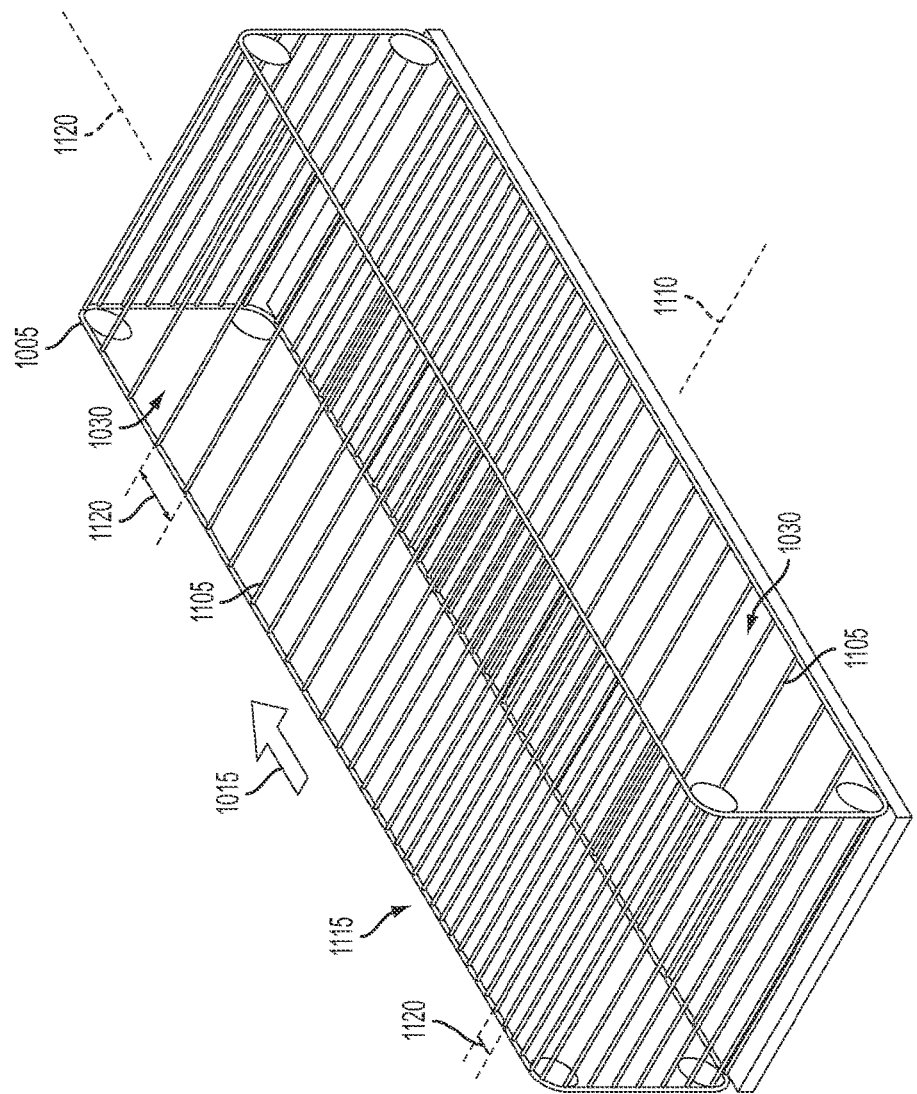
FIG. 11 is a perspective view depicting one example of an apparatus for processing produce, according to an illustrative implementation.
Figure 12:
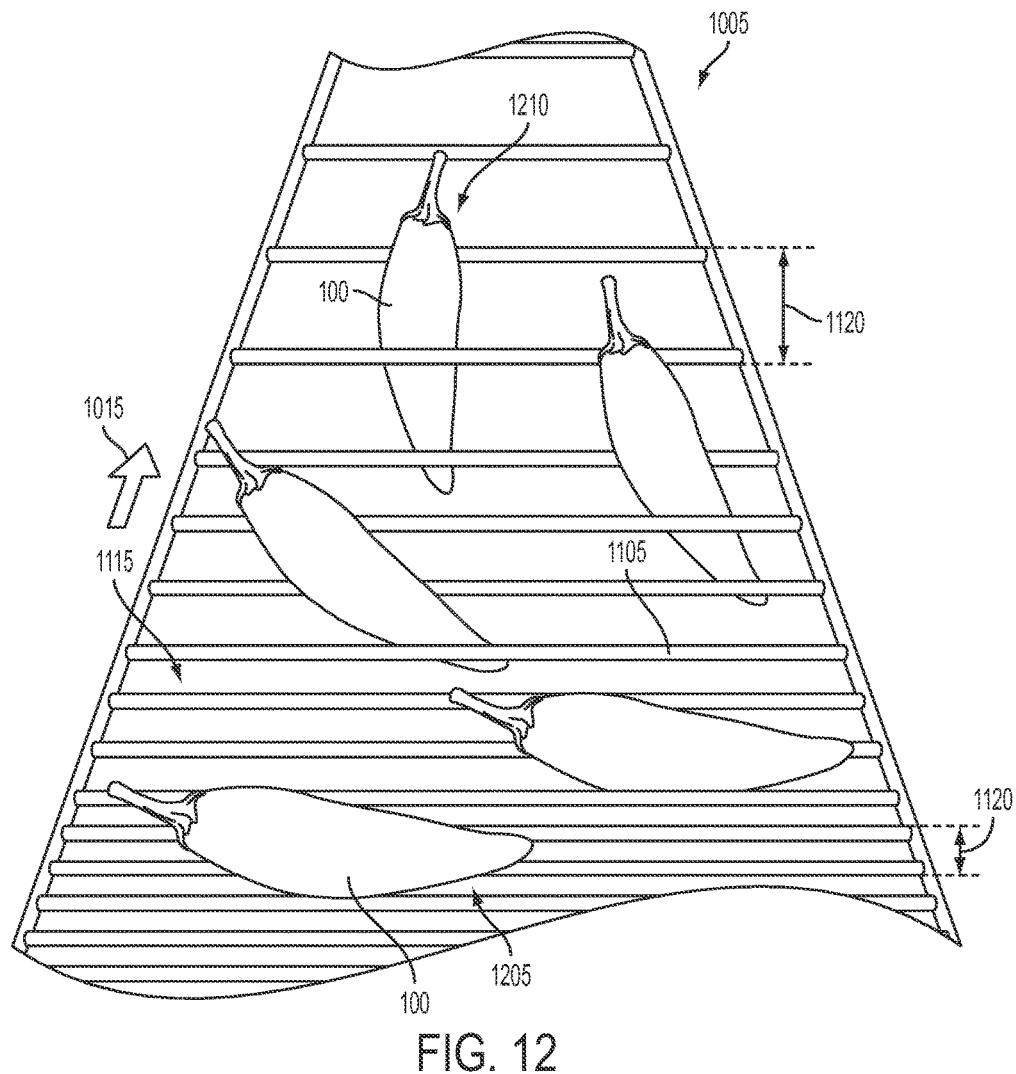
FIG. 12 is a perspective view depicting one example of an apparatus for processing produce, according to an illustrative implementation.

FIG. 11 and FIG. 12 depict examples of portions of the sizing unit 1005 of the produce processing system 1000. The sizing unit 1005 can include a plurality of rollers 1105 configured for conveyance in the direction of motion 1015, e.g., along a longitudinal axis 1120. The rollers 1105 can be part of a conveying unit of the sizing unit 1005, including for example the frame 1007 including beams, support structures, driving units or a control system configured to convey the rollers 1105 in a generally rectangular path defining an opening 1030, or in other elliptical, quadrilateral, square, or triangular paths. The rollers 1105 can be arranged substantially in parallel (e.g., +/−10 degrees) with each other, disposed longitudinally along the lateral axis 1110 of the sizing unit 1105, as in the example of FIG. 11. In some implementations, as the rollers 1105 are conveyed in the direction of motion 1015 along the top surface 1115 of the sizing unit 1005, the lateral distance 1120 between consecutive rollers 1105 increases, for example, from less than one inch to four inches. The lateral distances 1120 between the rollers 1105 can vary both within and outside this one to four inch range, for example to accommodate different sizes of the produce 100. The rollers 1105 can be free-spinning elements that rotate about the lateral axis 1110, or the rollers 1105 can be driven to rotate by one or more driving units or a sizing unit control system. The rollers 1105 can include ribbings, a ribbed sleeve, dimples, or a coarse sand-paper like surface that include abrasive material on the outer surface of the rollers 1105. These elements, for example, can grip or lightly secure (e.g., without puncturing, tearing, or damaging) the produce 100 in position on the sizing unit 1005. The rollers 1105 can also be smooth.

The produce 100 can be placed on the top surface 1115 of the sizing unit 1005, as in the example of FIG. 12, which depicts an example of a portion of the sizing unit 1005 conveying the produce 100 in the direction of motion 1015, e.g., from the foreground to the background from the perspective of FIG. 12. As the lateral distance 1120 between the rollers 1105 increases as the rollers 1105 move in the direction of motion 1015, gravitational force and the shape of the produce 100 cause the produce 100 to fall between two consecutive rollers 1105. For example, the produce 100 may be disposed on the top surface 1115 in the initial position 1205 where the produce 100 is lying across one or more rollers 1105 and the majority of the produce 100 is on or above the top surface 1115.

As the lateral distance 1120 between rollers 1105 increases during conveyance in the direction of motion 1015, gravity and the shape of the produce 100 can cause the produce 100 to move into an intermediate position, where portions (e.g., at least some of the first portion 105) begin to hang from, drop, or pass through the top surface 1115. In some implementations, the produce 100 is eventually disposed in the aligned position 1210. Various types of produce 100 will align themselves in generally repeatable positions given their generally uniform shapes and weight distributions. For example, the produce 100 may be a longitudinal pepper. In the aligned position 1210, the longitudinal pepper can be generally disposed in a vertical (e.g., +/−10 degrees) position, along a longitudinal axis of the longitudinal pepper with the tip of the pod 115 or the first portion 105 of the produce 100 pointing down, towards the receiving unit 1010, and with the stem 120 or the second portion 110 of the produce 100 pointing up, away from the receiving unit 1010. For a period of time, the produce 100 can be held in the aligned position 1210 between two rollers 1105, for example when the lateral distance 1120 is substantially the same (e.g., +/−10%) as a lateral diameter of a portion of the produce 100. As the lateral distance 1120 expands during conveyance in the direction of motion 1015, eventually the lateral distance 1120 can become greater than a maximum lateral diameter of the produce 100, and gravity or other forces can cause the produce 100 to drop between consecutive rollers 1105 with the produce 100 oriented generally in the aligned position 1210. Items of produce 100 having a smaller maximum lateral diameter can fall between consecutive rollers 1105 before items of produce 100 having a larger maximum lateral diameter.

Figure 13:
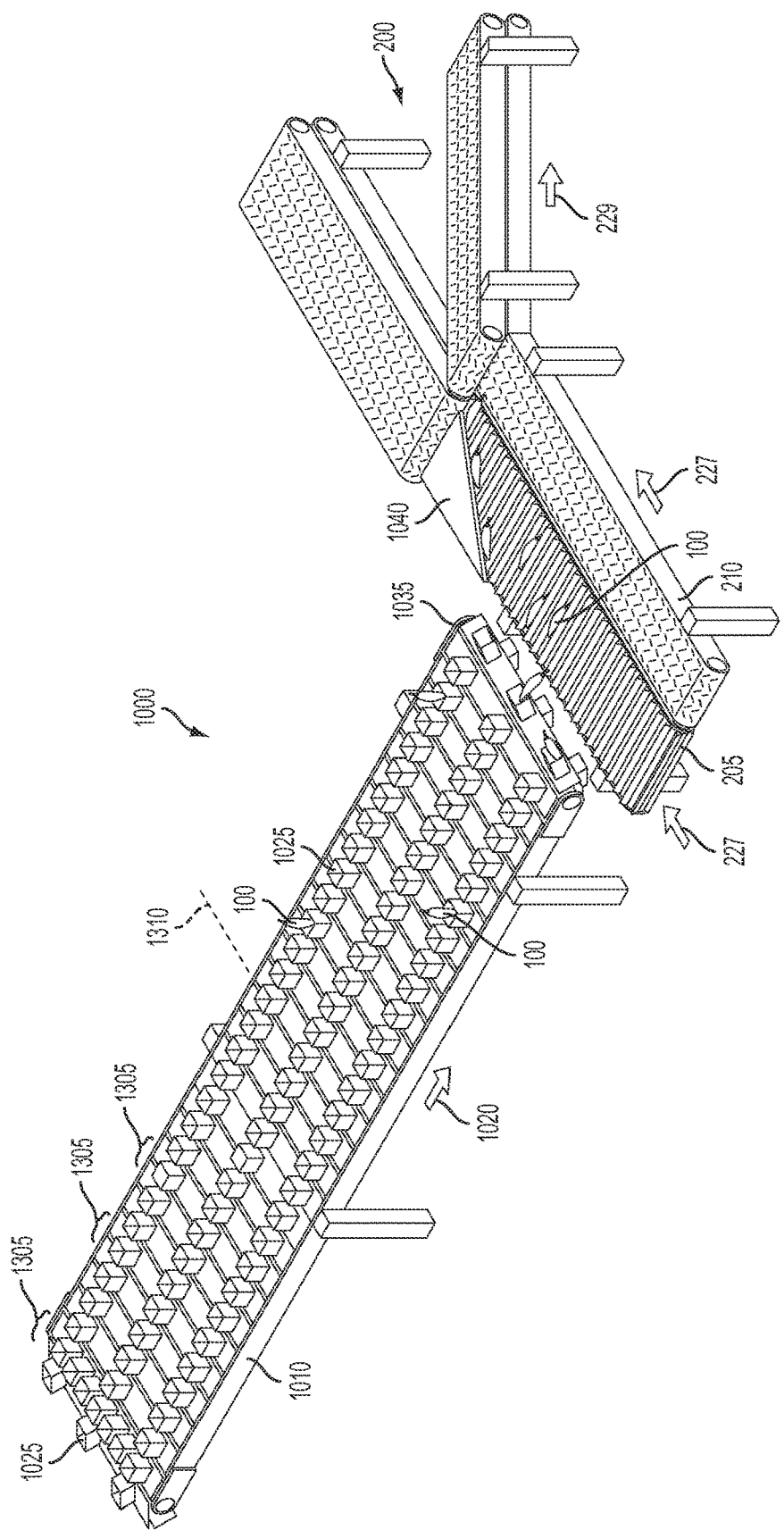
FIG. 13 is a perspective view depicting one example of an apparatus for processing produce, according to an illustrative implementation.

FIG. 13 depicts an example of portions of the receiving unit 1010 and the de-stemming apparatus 200 of the produce processing system 1000. The receiving unit 1010 can include a plurality of produce receptacles 1025. For example, the produce receptacle 1025 can be aligned in rows 1305, with varying numbers of the produce receptacles 1025 per row 1305. The rows 1305 can be aligned along the longitudinal axis 1120 of the sizing unit 1105, or along a lateral axis 1310 of the receiving unit 1010. The rows 1305 can be substantially parallel (e.g., +/−10%) with each other. In some implementations, rather than rows 1305, the produce receptacles 1025 can be in disposed in other configurations or patterns on the receiving unit 1010. In some examples, at least one row 1305 includes exactly one produce receptacle 1025, with a cavity configured to receive more than one item of produce 100. The produce receptacles 1025 can be circular, curved, or closed on all (e.g., four) lateral sides. In some implementations, the produce receptacles 1025 are closed on three lateral sides and open on a fourth lateral side. Rather than lateral rows 1305, a single produce receptacle 1025 can extend along a longitudinal axis of the receiving unit 1010 in the form of a trough or longitudinal cavity extending in the direction of motion 1020.

The produce receptacles 1025 can be positioned proximate one another along each row 1305 and between adjacent rows so that the produce 100 released from the sizing unit 1005 will land in a cavity of one of the produce receptacles 1025, rather than landing on the receiving unit 1010 between produce receptacles 1025. For example, the produce receptacles 1025 can touch or be proximate to (e.g., within one inch of) at least one other produce receptacle 1025 in the same row 1305 or in an adjacent row 1305. In one implementation, each produce receptacle 1025 is configured to receive one item of produce 100, e.g., one pepper.

The produce receptacles 1025, or their cavities can have a uniform size, e.g., having a maximum width or diameter of less than four inches, between two inches and four inches, or the other sizes. For example, a first produce receptacle 1025 in a row 1305 can be disposed on the receiving unit 1010 so that it passes through the opening 1030 of the sizing unit 1005 beneath rollers 1105 that have a smaller lateral distance 1120, relative to a second produce receptacle 1025 in the same row 1305. In this example, the second produce receptacle 1025 in the row 1305 can be configured to receive produce 100 having a larger maximum width or diameter than the first produce receptacle in the row 1305. The second produce receptacle 1025 can be positioned so that it passes beneath the top surface 1115 of the sizing unit 1005 at a location where the lateral distance 1120 is greater than the lateral distance 1120 above the first produce receptacle 1025 in the row 1305.

The produce 100 can be conveyed in the direction of motion 1020 in the aligned position 1210 in cavities of the produce receptacles 1025 subsequent to the produce 100 dropping from the sizing unit 1005 into the produce receptacles 1025 in the aligned position 1210. When the produce receptacle 1025 reaches the end portion 1035, conveyance of the produce receptacle 1025 around the end portion 1035 can expel the produce 100 from the produce receptacle 1025. The produce 100 can land on the first conveyor unit 205, for example with the first portion 105 of the produce 100 on the first conveyor unit 205 proximate to the end portion 1035. In this example, the second conveyor unit 210 can be disposed distal to the end portion 1035, relative to the first conveyor unit 205, with the first conveyor unit 205 between receiving unit 1010 and the second conveyor unit 210.

In some implementations, rather than expelling the produce directly from the produce receptacle 1025 onto the de-stemming apparatus 200, the produce processing system 1000 includes a supplemental conveyor unit disposed between the end portion 1035 of the receiving unit 1010 and the first conveyor unit 205 of the de-stemming apparatus 200. The supplemental conveyor unit can convey the produce 100 in the direction of motion 1020 and deposit the produce 100 at least partially on the first conveyor unit 205. The first conveyor unit 205 can receive at least the first portion 105 of the produce 100 from the produce receptacle 1025 or from the supplemental conveyor unit disposed between the receiving unit 1010 and the first conveyor unit 205. The supplemental conveyor unit can be a stand-alone unit or an extension of the receiving unit 1010 or the de-stemming apparatus 200. The supplemental conveyor unit can have various lengths, e.g., one foot, two feet, or less than five feet measured along the direction of motion 1020, and can have a width substantially the same (e.g., +/−10%) as a width of the receiving unit 1010. In one implementation, the supplemental conveyor unit moves faster than at least one of the receiving unit 1010 and the first conveyor unit 205.

The components of the produce processing system 1000 can be stand-alone devices or integral parts of the produce processing system. For example, the sizing unit 1005, the receiving unit 1010, and the de-stemming apparatus 200 can be separate individual devices, or can be an integrated part of the produce processing system 1000. The various conveyor units and elements of the sizing unit 1005, the receiving unit 1010, and the de-stemming apparatus 200 can be driven by one or more drive units (e.g., motors) such as one or more driving units 235. In one implementation, all conveyor units can be in motion simultaneously at substantially the same speed (e.g., +/−10%) under the control of one or more drive units.

Figure 14:
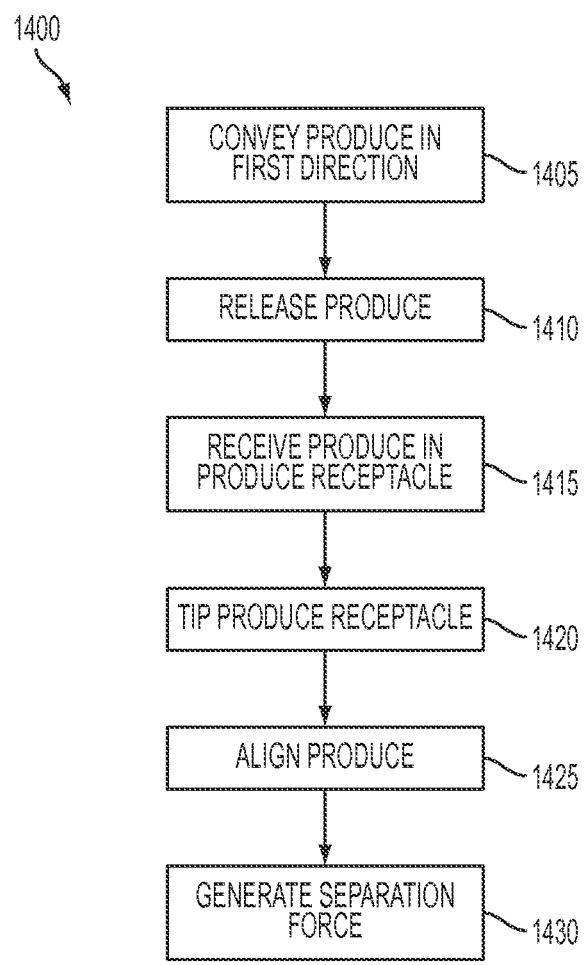
FIG. 14 is a flow diagram illustrating a method of processing produce, according to an illustrative implementation.

FIG. 14 is a flow chart of a method 1400 of processing the produce 100. The method 1400 can include conveying the produce 100 in a first direction (ACT 1405). For example, the sizing unit 1005 can convey the produce 100 in the direction of motion 1015. The method 1400 can also include releasing the produce (ACT 1410). For example, the sizing unit 1005 can release the produce 100 in a vertical position (e.g., the aligned position 1210) during conveyance of the produce 100 in the direction of motion 1015.

The method 1400 can also include receiving the produce 100 in the produce receptacle 1025 (ACT 1415). For example, the produce 100 can land in the produce receptacle 1025 during conveyance of the produce receptacle in the direction of motion 1020 with the produce receptacle 1025 oriented in a first position, e.g., with a cavity of the produce receptacle facing up, toward the top surface 1115 of the sizing unit 1005 when the produce receptacle 1025 passes through the opening 1030 of the sizing unit 1005. The method 1400 can include tipping the produce receptacle 1035 from a first position to a second position (ACT 1420). For example, the produce receptacle can tip or change orientations during conveyance around the end portion 1035 of the receiving unit 1010. This can expel the produce 100 onto at least one additional conveyor unit, such as the conveyor unit 205 or the supplemental conveyor unit between the receiving unit 1010 and the de-stemming apparatus 200.

The method 1400 can include aligning the produce 100 for engagement with at least one additional conveyor unit (ACT 1425), such as any of the first conveyor unit 205, the second conveyor unit 210, the third conveyor unit 215, the fourth conveyor unit 220, or a supplemental conveyor unit between the produce receptacle 1025 and the first conveyor unit 205. In one implementation, once disposed on the de-stemming apparatus 200, the alignment element 1040 aligns the produce for engagement with at least one conveyor unit.

The method 1400 can also include generating a separation force on the produce 100 (ACT 1430). For example, the method 1400 can align to produce on the de-stemming apparatus 200, or convey the produce 100 toward the de-stemming apparatus 200, to generate a separation force due to conveyance of the produce 100 in at least one of the direction of motion 227 and the direction of motion 229.

FIG. 15, FIG. 16, FIG. 17, FIG. 18, FIG. 19, and FIG. 20, among others, depict examples of portions of the produce processing system 1000, e.g., portions of an apparatus for processing produce. With reference to FIGS. 1-21, the receiving unit 1010 can convey the produce 100, e.g., the direction of motion 1020 or generally from the background to the foreground in the perspective of FIG. 15, among others. At least one driving unit 235 can drive the receiving unit 1010 to convey the produce. The same or a different driving unit 235 can drive other components of the produce processing system 1000 such as at least one of conveyor units 205, 210, 215, or 220, or the alignment element 1040.

The produce processing system 1000 can include at least one supplemental conveyor unit 1505 to guide the produce 100 (or individual items thereof) from the receiving unit 1010 onto at least one component of the de-stemming apparatus 200, such as the first conveyor unit 205 or the second conveyor unit 210. For example, the supplemental conveyor unit 1505 can deposit the produce 100 at least partially on the first conveyor unit 205 by providing at least one channel 1510 or path for the produce 100 to follow upon conveyance in the direction of motion 1020 past the end portion 1035 of the receiving unit 1010 toward the first conveyor unit 205 or the second conveyor unit 210.

The supplemental conveyor unit 1505 can include a frame or support structure 1515 to fix the supplemental conveyor unit in position. For example, the frame 1515 can secure at least part of the supplemental conveyor unit 1505 above the top surface 245 of the first conveyor unit 205. The frame 1515 can also secure at least part of the receiving unit in position, and can secure at least one driving unit 235 in position, for example to drive the receiving unit 1010. In some implementations, the frame 1515 secures both the supplemental conveyor unit 1505 and the receiving unit 1010 in position. The frame 1515 can be separate from or part of a larger frame assembly to secure other parts of the overall system or apparatus, such as the de-stemming apparatus 200 or the sizing unit 1005. The frame 1515 can be part of the mounting structure 280 or can be a separate component from the mounting structure 280.

The supplemental conveyor unit 1505 can include at least one channel wall 1520. Two channel walls 1520 (e.g., successive, parallel, converging, or adjacent to each other) can define one channel 1510 between them. The channel walls 1520 can be spaced apart from one another by between one inch and ten inches. Two channel walls 1520 can be substantially parallel (e.g., within +/−10 degrees) of one another, or can converge toward each other, e.g., in the direction of motion 1020. The supplemental conveyor unit 1505 can define one channel 1510 or multiple (e.g., between two and several dozen) channels 1510. The channels 1510 can be defined to extend at least in part between the end portion 1035 of the receiving unit 1010 and the top surface 245 of the first conveyor unit 205. The channels 1510 can also be defined by the channel walls 1520 at least in part above a top surface 1525 of the receiving unit 1010. For example, at least one channel 1510 can extend proximate to at least a portion of the top surface 1525 of the receiving unit 1010. The channels 1510 can be aligned at least in part in a direction perpendicular to the longitudinal length of the openings 1030 of the sizing unit 1005.

In some implementations, the channel walls 1520 do not contact the top surface 245 of the first conveyor unit 205, or also do not contact the top surface 1525 of the receiving unit 1010. For example, during operation, the top surface 1525 of the receiving unit can be in motion in the direction of motion 1020, and the top surface 245 of the first conveyor unit 205 can be in motion in the direction of motion 227. The supplemental conveyor unit 1505 or components thereof such as the channel walls 1520 can be static or fixed components, (e.g., not moving or not being driven by the driving units 235.) There can be a gap or space between the static supplemental conveyor unit 1505 (or components thereof) and the moving first conveyor unit 205 or the moving receiving unit 1010 to avoid contact interference during operation. The supplemental conveyor unit 1505 can be a fixed static unit that is not in motion during operation of other components of the apparatus for processing items of the produce 100.

The channels 1510 can be parallel with one another, and the supplemental conveyor unit 1505 can define any number of channels 1510, e.g., from one channel 1510 to dozens of channels 1510 or more. The channels 1510 can receive the produce 100 from the receiving unit 1010, and can guide the produce 100 from the receiving unit 1010 to components of the de-stemming apparatus 200 such as the first conveyor unit 205 or the second conveyor unit 210, where the produce 100 can be deposited, e.g., on the top surface 245 or the top surface 255. The first conveyor unit 205 or the second conveyor unit 210 can convey the produce 100 (e.g., in the direction of motion 227) toward at least on additional conveyor unit (e.g., the third conveyor unit 215 or the fourth conveyor unit 220), which can engage at least part of the produce 100 and subject the produce 100 to a separation force that can separate the first portion 105 of the produce 100 from the second portion 110 during conveyance through the de-stemming apparatus 200.

Figure 16:
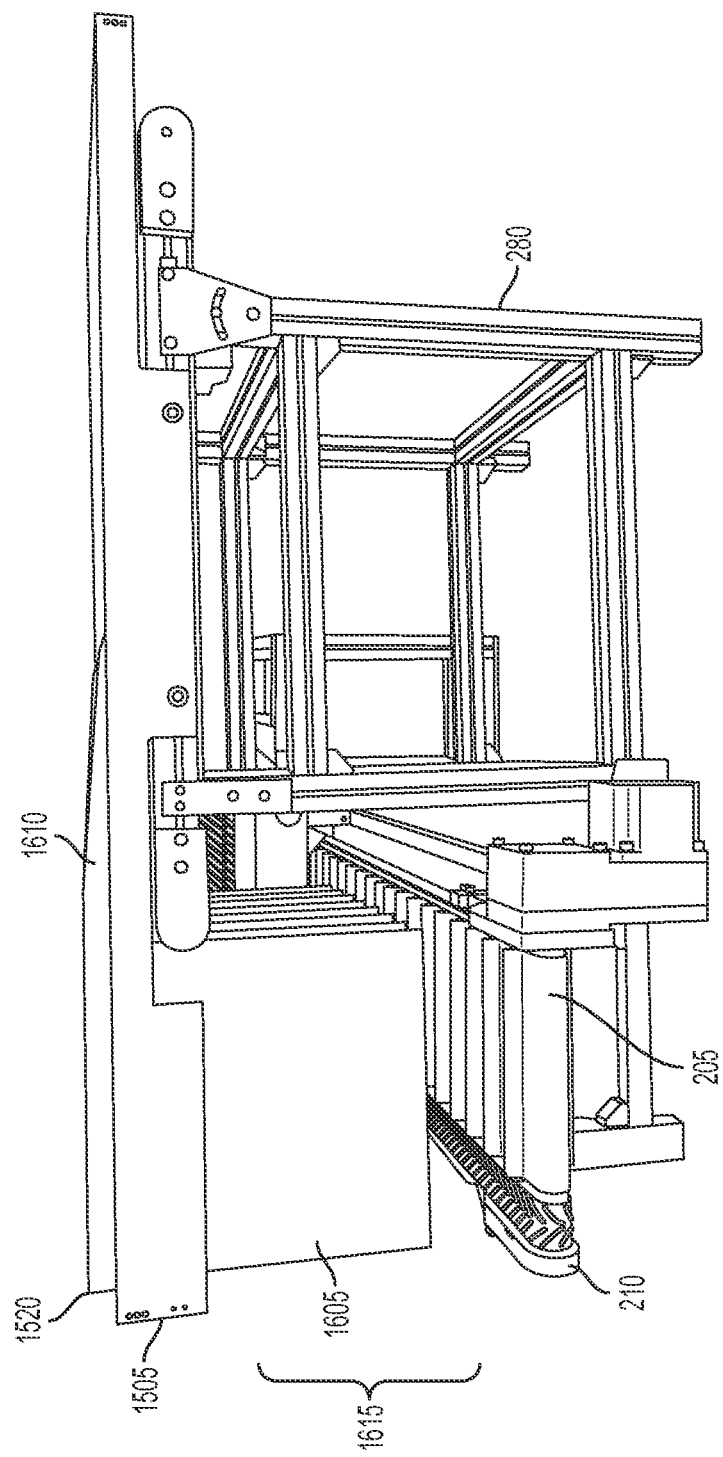
FIG. 16 is a perspective view depicting one example of an apparatus for processing produce, according to an illustrative implementation.
Figure 17:
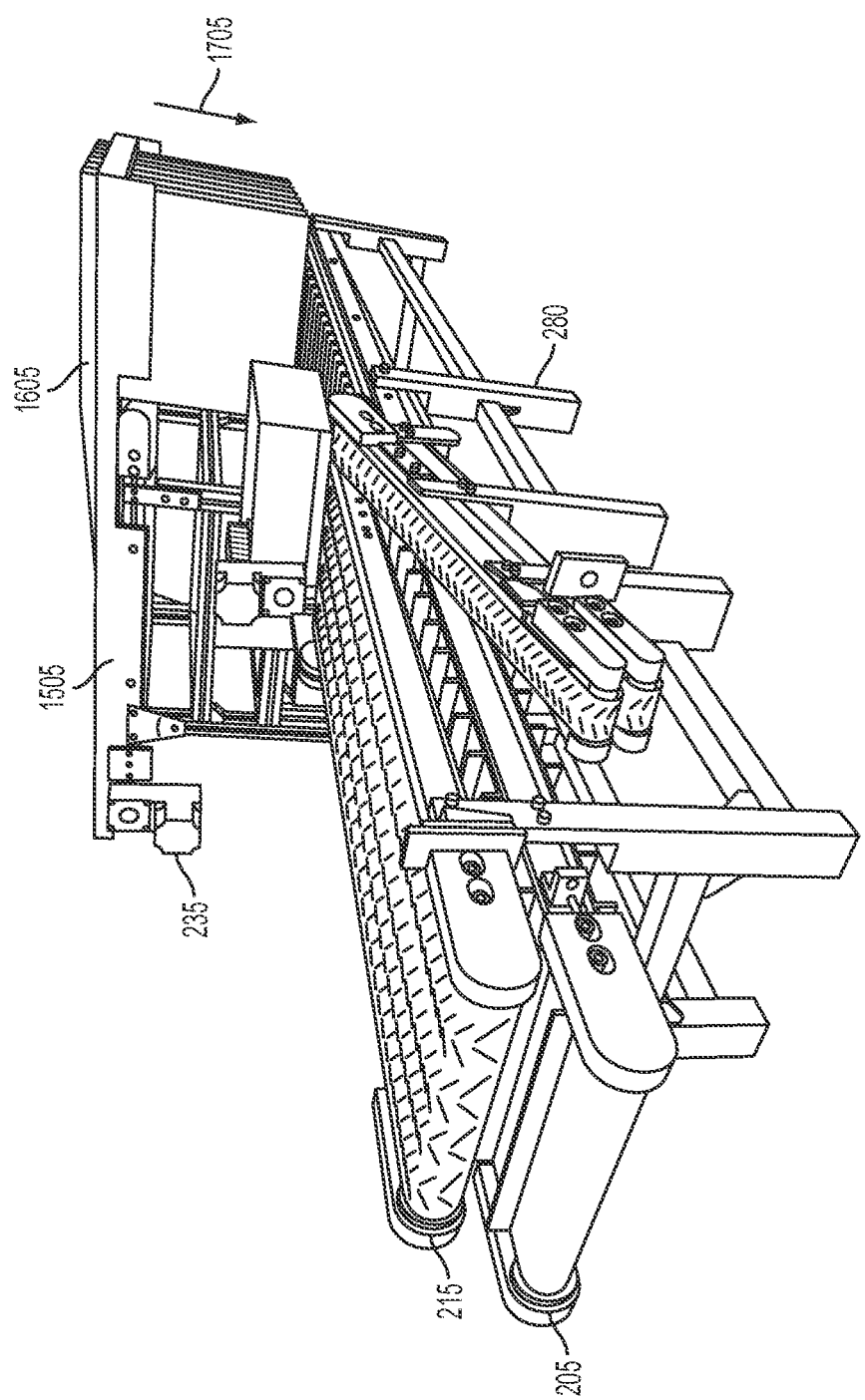
FIG. 17 is a perspective view depicting one example of an apparatus for processing produce, according to an illustrative implementation.
Figure 18:
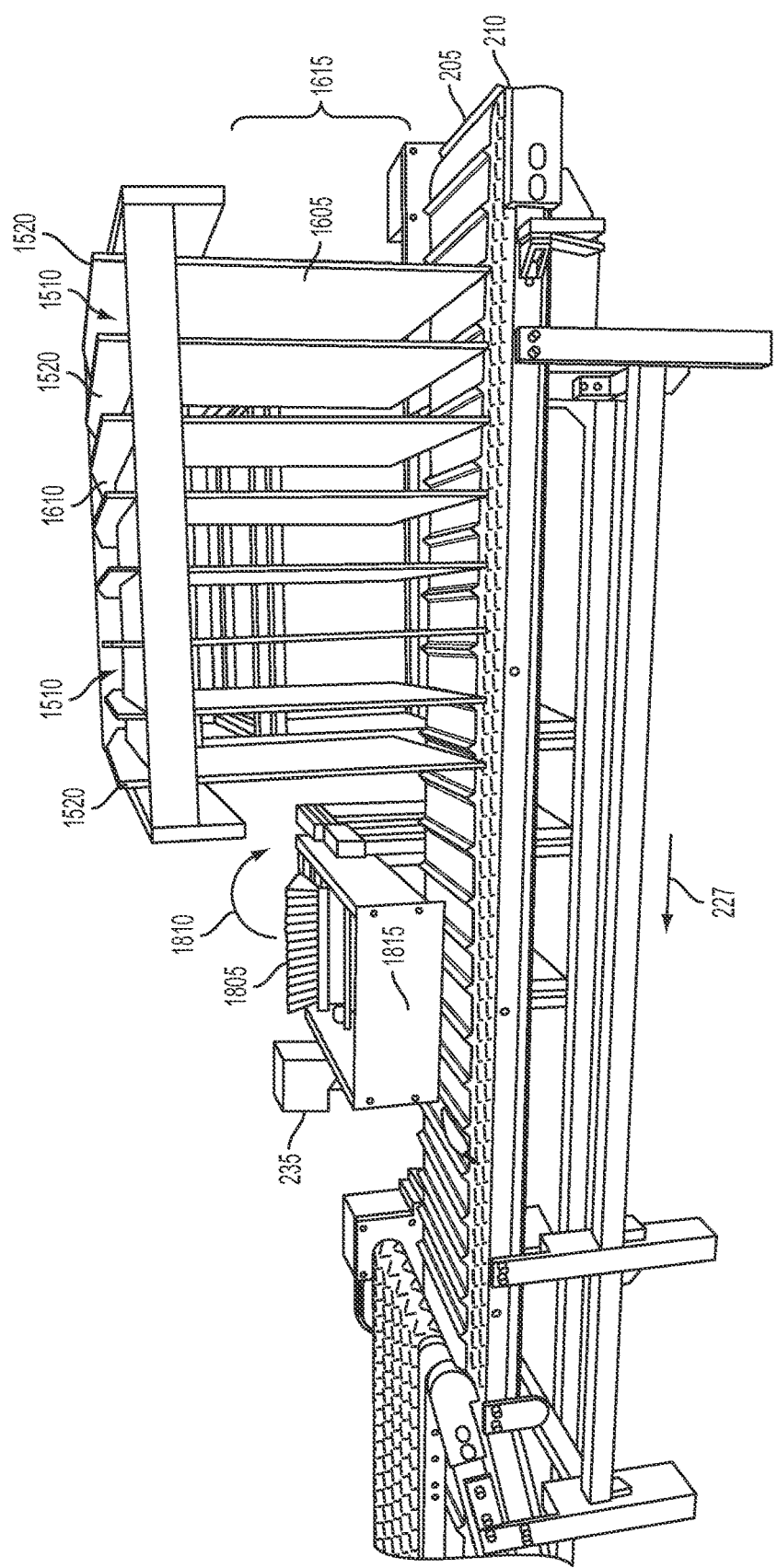
FIG. 18 is a perspective view depicting one example of an apparatus for processing produce, according to an illustrative implementation.
Figure 19:
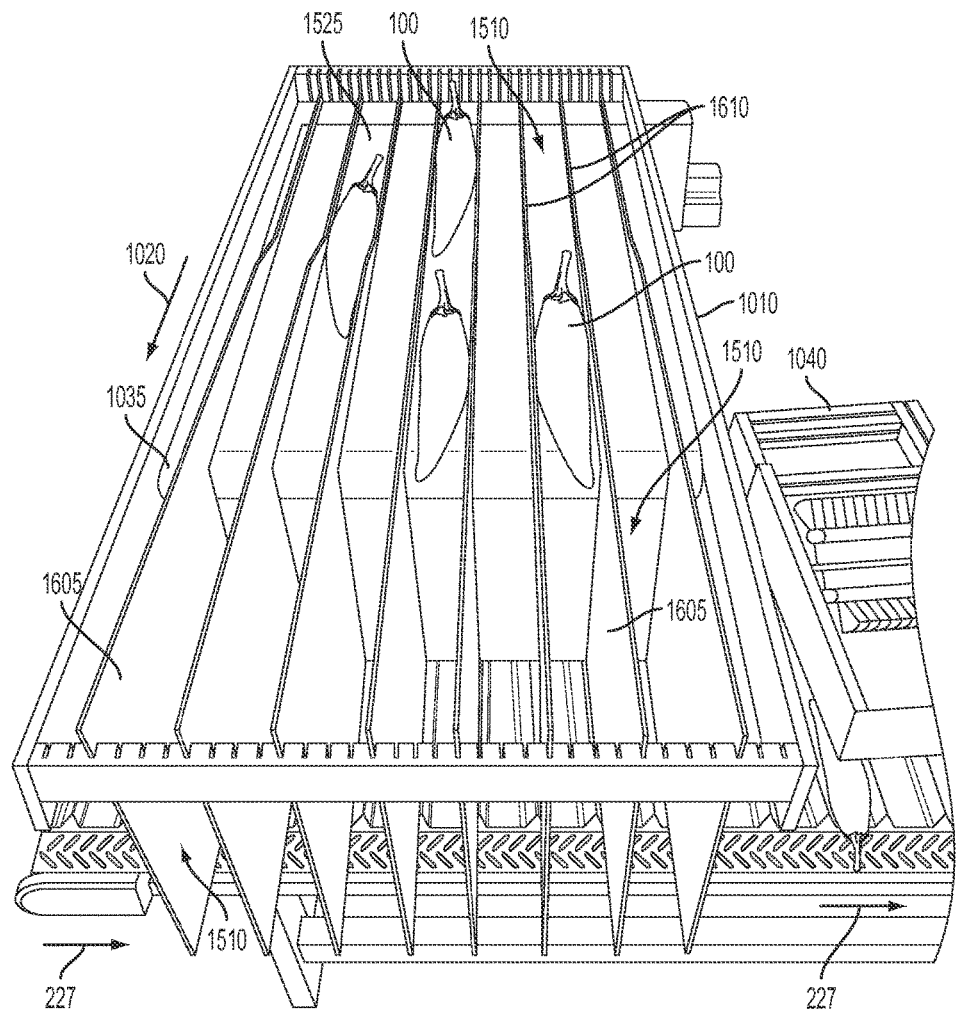
FIG. 19 is a perspective view depicting one example of an apparatus for processing produce, according to an illustrative implementation.
Figure 20:
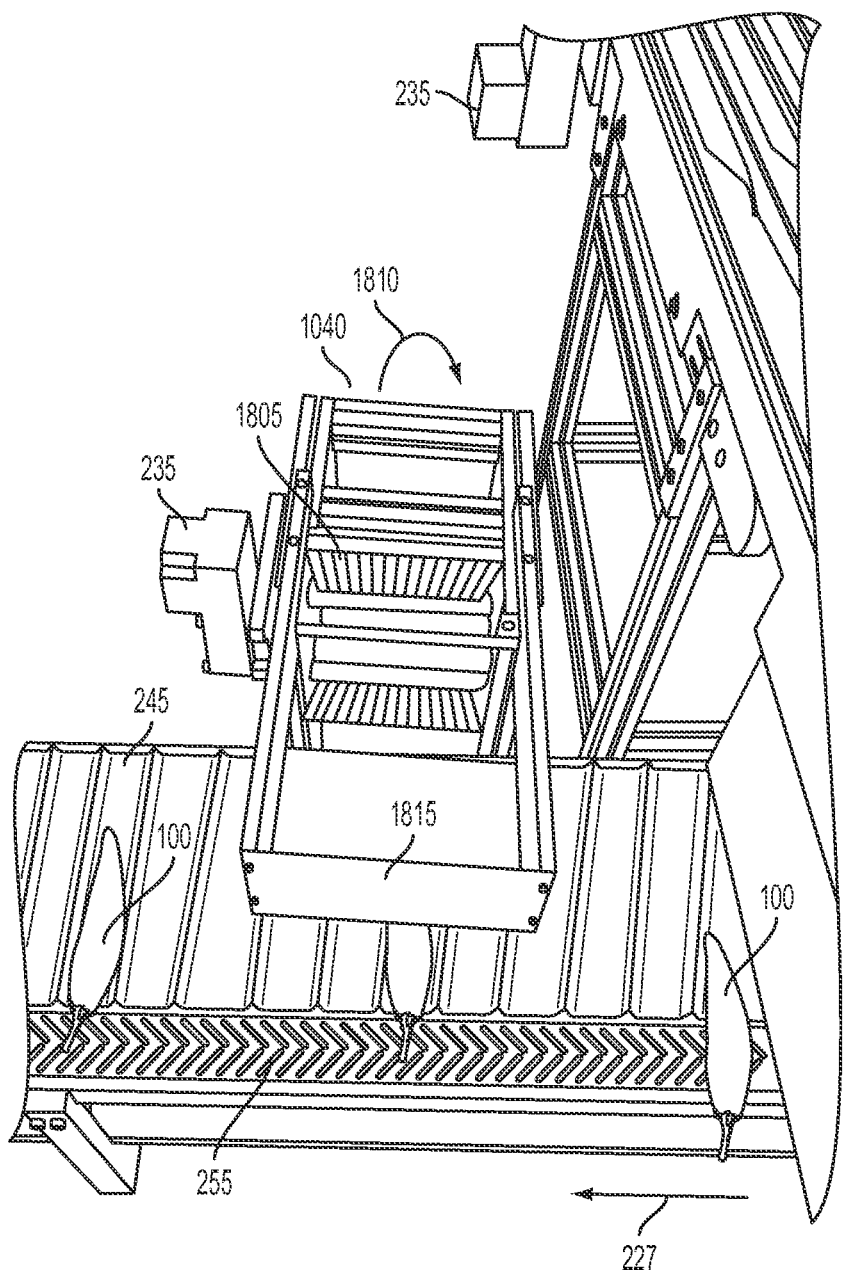
FIG. 20 is a perspective view depicting one example of an apparatus for processing produce, according to an illustrative implementation.

Referring to FIG. 16, among others, the channel walls 1520 can include at least one tab portion 1605 and at least on extension portion 1610. The tab portion 1605 and the extension portion 1610 can be integral parts of a single continuous channel wall 1520, or can be separate components of the channel wall 1620 that are hinged, connected, fastened, or otherwise secured to one another. The tab portions 1605 can be disposed after, downstream from in direction of motion 1020, or proximate to the end portion 1035 of the receiving unit 1010. The tab portions 1605 of two adjacent, successive, parallel, or proximate channel walls 1520 can define at least a portion of the channel 1510, such as the portion of the channel 1510 between the end portion 1035 of the receiving unit 1010 and the top surface 245 of the first conveyor unit 205 or the top surface 255 of the second conveyor unit 210. This portion of the channel 1510 can position the produce 100 (e.g., received from the sizing unit 1005) on the top surface 1525 of the receiving unit 1010 and can guide the produce 100 within the channel 1510 in the direction of motion 1020. This portion of the channel 1510 can be equal to, greater than, or less than a length (e.g., in the direction of motion 1020) of the receiving unit 1010. The width of this portion of the channel 1510 can be between 1 and 10 inches. The tab portions 1605 can be spaced apart or separated from the end portion 1035 (e.g., from 0.25 to 5.0 inches) so that the tab portions 1605 do not contact the receiving unit 1010 during operation of the receiving unit 1010 in the direction of motion 1020.

The extension portions 1610 can be disposed above the top surface 1525 of the receiving unit 1010, and can be spaced apart or separated from the top surface 1525 (e.g., from 0.25 to 5.0 inches) so that the extension portions 1610 do not contact the receiving unit 1010 during operation of the receiving unit in the direction of motion 1020. The extension portions 1610 of two adjacent, successive, parallel, or proximate channel walls 1520 can define at least a portion of the channel 1510, such as the portion of the channel 1510 proximate to (e.g., above) the top portion 1525 of the receiving unit 1010 (e.g., between the top portion 1525 of the receiving unit and the sizing unit 1005).

The height 1615 (e.g., the vertical or drop distance in direction of motion 1705 between the end portion of the portion of the channel 1510 defined by the tab portions 1605) can vary. For example, the tab portions 1605 can extend substantially (e.g., within 10%) the vertical or drop distance 1615 between the end portion 1035 of the receiving unit 1010 and the top surface 245 of the first conveyor unit 205. The tab portions 1605 can also extend through a smaller portion of this height 1615 (e.g., vertical or drop distance), such as less than 50% of this distance, or less than 25% of this distance. The height 1615 between the top surface 1525 and the top surface 245 can be at least five inches, measured from the end portion 1035 to the top surface 245. The height 1615 (e.g., a height of the channel 1510 between the tab portions 1605) can be at least twice the length of the produce 100. For example, to process a pepper having a length of 3 inches, the height 1615, or the distance that the pepper falls in the direction of motion 1705 from the receiving unit 1010 to the de-stemming apparatus 200 can be at least six inches. In some implementations, the height 1615 is two to three times the length of the produce 100.

The channel 1510 can guide the produce through the channel 1510 from release by the sizing unit 205 along the receiving unit 1010 in the direction of motion 1020 to at least one additional conveyor unit (e.g., of the de-stemming apparatus 200). For example, when the item of produce 100 is a pepper, the channel 1510 can guide the pepper in a tip first orientation along the receiving unit 1010, e.g., between two extension portions 1610. Upon conveyance past the end portion 1035 of the receiving unit 1010, the channel 1510 can guide the pepper or other item of produce 100 as the produce 100 falls, within the channel 1510 (e.g., between two tab portions 1605 in the direction of motion 1705), from the receiving unit 1010 onto a component of the de-stemming apparatus 200, such as the top surface 245 of the first conveyor unit 205. During this free-fall of the produce 100, e.g., through a portion of the channel 1510 between two tab portions 1605 in the direction of motion 1705 (e.g., height 1615), the produce 100 can flip 180 degrees. For example, a pepper 100 having a tip first orientation in the direction of motion 1020 in the channel 1510, e.g., between adjacent extension portions 1610 as in the example of FIG. 19 can flip 180 degrees when falling through the channel 1510, e.g., between the tab portions 1605, so that the tip of the pepper 100 points in the opposite direction when landing on the top surface 245 or the top surface 255, relative to the direction the tip was pointing during conveyance on the receiving unit 1010, as in the example of FIG. 20.

In some implementations, the produce can flip during this free fall in the absence of the tab portions 1605. In one implementation, a roller or separate conveyor unit can be disposed proximate to the end portion 1035. This roller can spin or move in the direction of motion 1020 at a speed faster than a conveying speed of the top surface 1525. This can accelerate the produce 100 when it passes the end portion 1035, facilitating the flip of the produce 100 during its fall through the height 1615.

The tab portions 1605 need not cover the entire width of the first conveyor unit 205 or the second conveyor unit 210. For example, the tab portions 1605 can extend past the end portion 1035 of the receiving unit 101 a distance that is less than the combined width of the first conveyor unit 205 and the second conveyor unit 210, or a distance that is less than the width of the first conveyor unit 205. The extension portions 1610 can have a length greater than, equal to, or less than a length of the receiving unit 1010, e.g., from a few inches to several dozen feet or more.

The channel walls 1520 may but need not include both the tab portion 1605 and the extension portion 1610. For example, the tab portions 1605 or the extension portions 1610 can be absent from the channel walls 1520. The receiving unit 1010 can include at least one trough. For example, the produce receptacle 1025 can be formed as a longitudinal trough that can receive multiple items of the produce 100, rather than an individual produce item receptacle. The trough can be a longitudinal trough along the direction of motion 1020 that includes a groove, conduit, depression, curved, or concave feature in the top surface 1525 of the receiving unit 1010 that receives the produce 100, e.g., from the sizing unit 1005. The trough can be aligned with at least a portion of the channel 1510 to receive or guide the produce 100, or can be a substitute for the portion of the channel 1510 that would otherwise be disposed above the receiving unit 1010. The receiving unit 1010 can define a plurality of troughs. Each trough can be aligned with at least a portion of one of the channels 1510 along a longitudinal axis of the receiving unit 1010, e.g., in the direction of motion 1020. The trough can include at least one retaining wall defining at least part of a space where the produce 100 can be disposed. For example, the retaining walls can be ridges or elevated portions of the top surface 1525 that complement or replace the extension portions 1610 to receive the produce 100, e.g., between successive or adjacent retaining walls. In some implementations, the extension portions 1610 can be separated from the top surface 1525 of the receiving unit, whereas the retaining walls can be an integral part of the top surface 1525. Both the extension portions 1610 and the retaining walls 1610 can operate to guide the produce 100 in the direction of motion 1020.

In some implementations, at least one channel 1510 guides the produce 100 to directly enter the de-stemming apparatus 200 at the pivot point 270 with the produce positioned for separation, reducing the length of or eliminating the first conveyor unit 205 and the second conveyor unit 210. For example, the portion of the channel 1510 between the tab portions 1605 can be shaped to position the produce 100 at the entrance area (e.g., within 2 feet of, or within 1 foot of) the pivot point 270. This portion of the channel 1510 may also include a ramp or blocking element to position the produce 100.

The receiving unit 1010 can receive the produce 100 from the sizing unit 1005. For example, the sizing unit 1005 can convey the produce 100 in the direction of motion 1015 at a first speed (e.g., between 0.1 and 4.0 feet per second) where the produce 100 eventually drops between successive rollers 1105 through the opening 1030 onto the top surface 1525 of the receiving unit 1010. The top surface 1525 (e.g., a conveyor belt) of the receiving unit 1010 can convey the received produce 100 at a second speed (e.g., between 0.1 and 4.0 feet per second) in the direction of motion 1020. The second speed can be greater than the first speed. For example, the sizing unit 1005 can operate to drop the produce 100 (e.g., a pepper) in a tip first orientation onto the receiving unit 1010. When the receiving unit 1010 operates at a greater speed than the sizing unit 1005, the top surface 1525 of the receiving unit 1010 can contact the tip of the produce and direct the tip in the direction of motion 1020, so that the produce 100 falls onto the top surface 1525 in a tip first orientation aligned in the direction of motion 1020, as in the example of FIG. 19.

The alignment element 1040 can include at least one brush 1805 and at least one driving unit 235. Any driving unit 235 can drive or rotate the brush 1805 through mechanical coupling (e.g., in the direction 1810 from the foreground into the background in the example of FIG. 18) to guide or position the produce 100 into position for the application of a separation force by at least one of the conveyor units of the de-stemming apparatus 200. The alignment element 1040 can be disposed above (e.g., proximate to) the top surface 245 of the first conveyor unit 205, as in the example of FIG. 18, among others. The alignment element 1040 can include at least one blocker element 1815 such as a plate to position the produce 100.

During conveyance of the produce 100 in the direction of motion 227 the brush 1805 (or other alignment element) can move the produce 100, for example to position part or a majority of the first portion 105 of the produce 100 (e.g., the pod) on the first conveyor unit 205 or to position at least a part of the second portion 110 of the produce 100 (e.g., the stem) on or over the second conveyor unit 210. The alignment element 1040 can include a frame or structural element 1820. At least part of the frame 1820 can contact the produce 100 to properly position the produce 100. In one implementation, in addition to or instead of the brush 1805, the alignment element can include walls or bars that can be driven by at least one driving unit 35 to sweep forward (e.g., into the foreground from the example perspective of FIG. 15, among others, perpendicular to the direction of motion 227) to push the produce 100 into a position for de-stemming or other separation.

The alignment element can be disposed above the first conveyor unit 205 or the second conveyor unit 210 downstream, in the direction of motion 227, from the supplemental conveyor unit 1505, e.g., between the supplemental conveyor unit 1505 and the third conveyor unit 215 or the fourth conveyor unit 220. The alignment element 1040 can include stationary rollers (e.g., free standing or driven by at least one driving unit 235) to hold the produce down at least in part on the top surface 245 while the produce 100 is pushed from the tip end toward a proper location, e.g., for stem or calyx separation. The brushes 1805 can be driven to move the produce 100 by applying a force to the produce 100 tangential to the direction of motion 227. The axes of the brushes 1805 (or rollers that may be used instead of the brushes 1805) can be parallel (e.g., +/−10%) to the direction of motion 227.

In addition or as an alternative to the brush 1805, the alignment element 1040 can include at least one roller, free standing or driven by at least one driving unit 235. For example, the rollers can be oriented in the same position as the brush, e.g., perpendicular to the direction of motion 227. The produce 100 can contact the rollers (or the brush 1805) to be moved or guided into position for separation of the first portion 105 of the produce 100 from the second portion 110.

Figure 21:
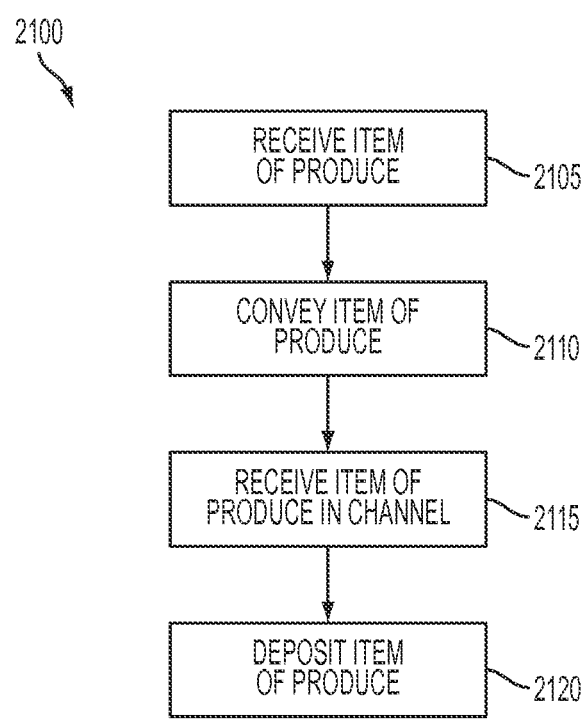
FIG. 21 is a flow diagram illustrating a method of processing produce, according to an illustrative implementation.

FIG. 21 depicts a method 2100 of processing the produce 100. The method 2100 can receive at least one item of produce (ACT 2105). For example, during operation of a produce processing apparatus, the receiving unit 1010 can receive the produce 100 (ACT 2105) from the sizing unit 1005, or from another input such as a funnel, conveyor, ramp, or human worker manually placing the produce 100 on the top surface 1525 of the receiving unit 1010. The method 2100 can include conveying the produce 100 (ACT 2110). For example, the receiving unit 1010 can convey at least one item of produce 100 in the direction of motion 1020 (ACT 2110) on the top surface 1525 of the receiving unit 1010.

The method 2100 can include receiving the item of produce 100 (ACT 2115). For example at least one item of the produce 100 can be received (ACT 2115) within at least one channel 1510 defined by at least two channel walls 1520. The method 2100 can include depositing the produce 100 (ACT 2120). For example, via the channel 1510 at least one item of the produce 100 can be deposited onto the first conveyor unit 205, which can convey the produce 100 in a direction (ACT 2120) different than the direction of conveyance by the receiving unit 1010. The conveyance of the deposited item of produce 100 can bring the produce 100 into contact with one or more conveyor units of the de-stemming apparatus 200 to generate a separation force that separates the first portion 105 of the produce 100 from the second portion 110 of the produce 100.

With reference to FIGS. 1-21, in some implementations the produce processing system 1000 (e.g., an apparatus) can include at least some elements of the sizing unit 1005, the receiving unit 1010, and the de-stemming apparatus 200. The sizing unit 1005 can include at least two rollers 1105 that can convey the produce 100 in the direction of motion 1015. The sizing unit 1005 can release the produce in the aligned position 1210 (e.g., vertically or within +/−10% of vertical) along a longitudinal axis of the produce 100 from the lateral distance 1120 between the two rollers 1105, during conveyance of the produce 100 in the direction of motion 1015. Some or all components of FIGS. 1-21 can be included as part of an apparatus for processing produce.

The receiving unit 1010 can receive the produce 100 in a cavity of the produce receptacle 1025, for example when the produce receptacle 1025 is conveyed in the direction of motion 1020, which can be substantially (e.g., +/−10%) perpendicular to the direction of motion 1015. The first conveyor unit 205 can receive the produce from the produce receptacle 1025 either directly or via an intervening supplemental conveyor unit. The first conveyor unit 205 can convey the produce in the direction of motion 227 to engage the produce with at least one additional conveyor unit (e.g., the second conveyor unit 210, the third conveyor unit 215, or the fourth conveyor unit 220) to generate a separation force on the produce 100 that can at least partially separate the first portion 105 of the produce (e.g., the pod 115) from the second portion 110 of the produce (e.g., the step 120 or the calyx 125). In some implementations, the direction of motion 227 can be substantially parallel (e.g., +/−10 degrees) with the direction of motion 1015, or substantially perpendicular (e.g., +/−10 degrees) with the direction of motion 220.

Figure 10:
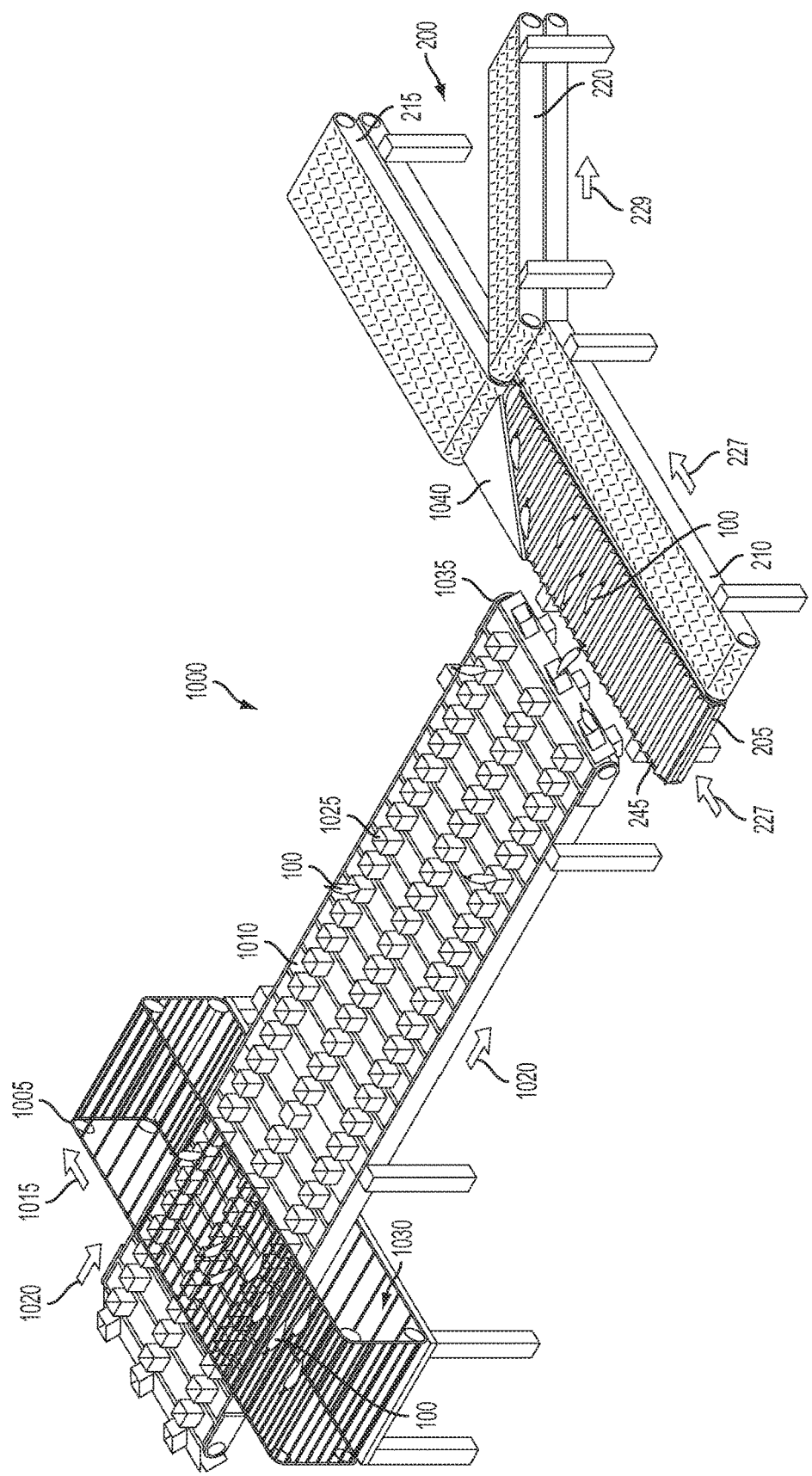
FIG. 10 is a perspective view depicting one example of an apparatus for processing produce, according to an illustrative implementation.
Figure 15:
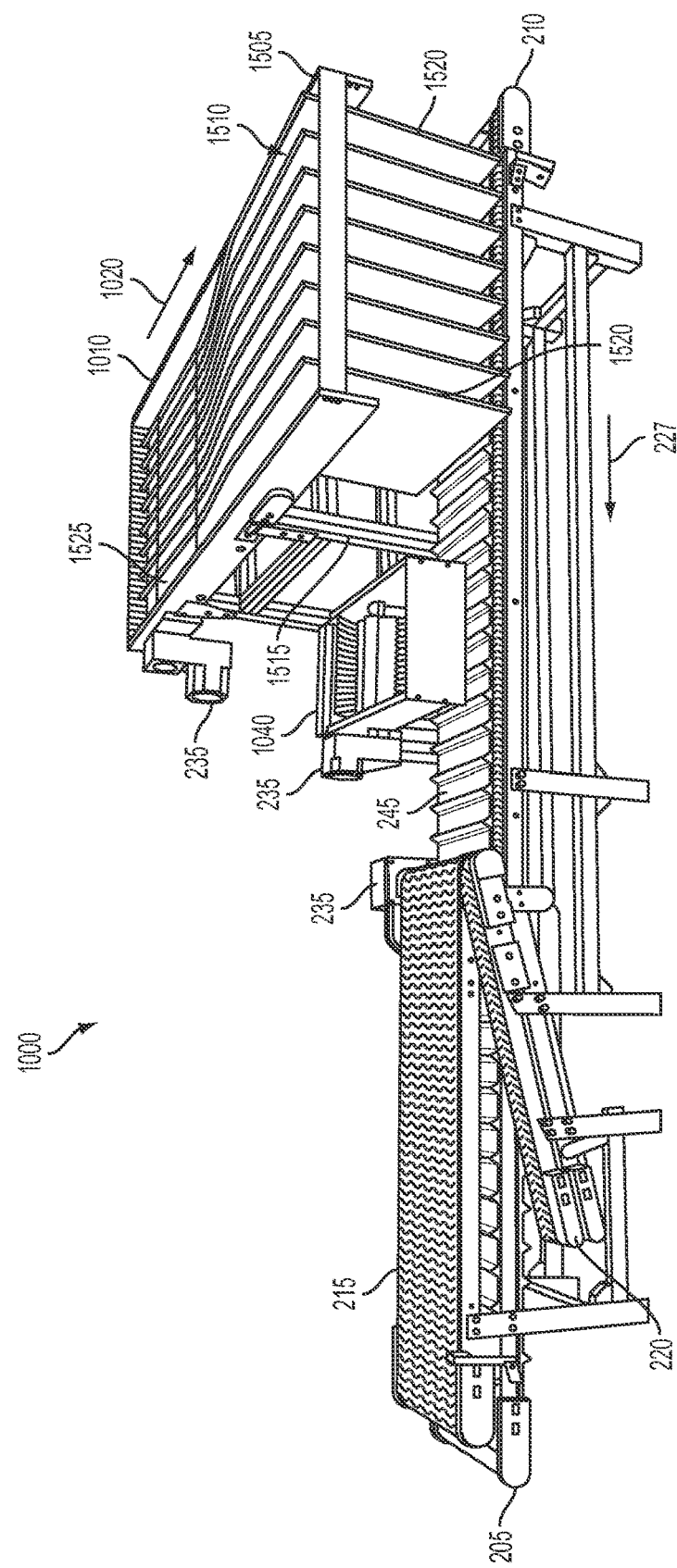
FIG. 15 is a perspective view depicting one example of an apparatus for processing produce, according to an illustrative implementation.

The de-stemming apparatus 200 of the produce processing system 1000 need not be substantially horizontal as depicted in FIG. 2, FIG. 10, and FIG. 15, among others. For example, the de-stemming apparatus 200 can be arranged vertically, with the produce 100 driven at least in part by gravitational force into engagement with at least one conveyor unit that generates all or part of the separation force. In a vertical or other non-horizontal configuration, (e.g., 30, 45, or 60 degrees from horizontal with reference to the top surface 245 or the top surface 255) the conveyor units 205, 210, 215, 220 can have varying lengths and widths, for example to accommodate space restrictions such as the height of the de-stemming apparatus 200 from the ground.

The operations described in this specification can be implemented as operations performed by a data processing apparatus on data stored on one or more computer-readable storage devices or received from other sources. For example, the driving unit 235 or any other driving unit can include or be controlled by control circuitry (e.g., at least one processor or application specific integrated circuit) that operates the driving unit to move at least one of the first to fourth conveyor units 205 to 220 or any other conveyor unit. At least one local computing device electrically connected (wired or wirelessly) with at least one of the driving units 235 or a remote computing device connected via the internet, local, wide, or other area network to at least one of the driving units 235 can control operation of the driving units 235 and the components directly or indirectly driven by the driving units 235.

Features that are described herein in the context of separate implementations can also be implemented in combination in a single embodiment or implementation. Features that are described in the context of a single implementation can also be implemented in multiple implementations separately or in various sub-combinations. Moreover, although features may be described above as acting in certain combinations and even initially claimed as such, one or more features from a claimed combination can in some cases be excised from the combination, and the claimed combination may be directed to a sub combination or variation of a sub combination.

Similarly, acts depicted in the drawings or described do not require performance in the particular order shown or in sequential order, and all illustrated or described acts need not be performed. Actions recited in the claims can be performed in a different order. Any method or processes depicted in the figures need not require the particular order shown, or sequential order, to achieve desirable results.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, specific references to a pod can include generic references to any first or generally edible portions of produce, and specific references to any stem or calyx include generic references to any second or generally uneaten portions of produce. Generic references to a first portion of produce include references to generally edible portions such as a pod or body, and generic references to a second portion of produce include references to generally uneaten portions such as a stem or calyx. Further, while not labeled in every Figure for clarity and ease of description, elements present and labeled in one Figure may be present and unlabeled in other Figures. For example, at least some of the conveyor belts 605, 610, 615, 620 labeled in FIG. 6 are present in other Figures, e.g., FIG. 2-7, 10, or 13. Further, while referred to as a de-stemming apparatus, the de-stemming apparatus 200 can remove portions of items of produce other than stems, such as leaves, branches, or other support structures or appendages of an item of produce.

The foregoing implementations are illustrative rather than limiting of the described systems and methods. For example, at least some of the directions of motion need not be substantially parallel or perpendicular relative to each other as discussed herein. For example, the direction of motion 1020 need not be substantially perpendicular to the direction of motion 1015 or the direction of motion 227, and the direction of motion 1015 need not be substantially parallel to the direction of motion 227. These directions of motions can convey the produce 100 in any direction between zero and 180 degrees relative to any other identified direction of motion. Further relative parallel, perpendicular, vertical or other positioning or orientation descriptions include variations within +/−10% or +/−10 degrees of pure vertical, parallel or perpendicular positioning. Scope of the systems and methods described herein is thus indicated by the appended claims, rather than the foregoing description, and changes that come within the meaning and range of equivalency of the claims are embraced therein.

What is claimed is:

1. A de-stemming apparatus for de-stemming produce having a pod, a stem, and a calyx, comprising:
   a first conveyor unit having a first belt that conveys the pod, the first conveyor unit having a top surface;
   a second conveyor unit having a second belt, the second conveyor unit disposed at an angle of greater than zero and less than 60 degrees relative to the top surface of the first conveyor unit;
   a third conveyor unit having a third belt that engages the pod between the top surface of the first conveyor unit and a bottom surface of the third conveyor unit, at least a portion of the third conveyor unit disposed with the bottom surface of the third conveyor unit in parallel with at least a portion of the top surface of the first conveyor unit to define an opening to engage the pod between the bottom surface of the third conveyor unit and the top surface of the first conveyor unit;
   a fourth conveyor unit having a fourth belt that engages the stem between a top surface of the second conveyor unit and a bottom surface of the fourth conveyor unit; and
   at least one driving unit that:
      drives at least one of the first conveyor unit, the second conveyor unit, the third conveyor unit, and the fourth conveyor unit to convey the produce from a first point of the de-stemming apparatus to a second point of the de-stemming apparatus, and
      generates a separation force between the pod and the stem that separates at least a portion of the stem and at least a portion of the calyx from the pod during conveyance of the produce between the first point and the second point, with the pod disposed in the opening between the bottom surface of the third conveyor unit and the top surface of the first conveyor unit and with the stem engaged by the fourth conveyor unit between the top surface of the second conveyor unit and the bottom surface of the fourth conveyor unit during at least a portion of the conveyance of the produce between the first point and the second point.

2. The apparatus of claim 1, further comprising:
   the top surface of the first conveyor unit and the bottom surface of the third conveyor unit that hold at least a portion of the pod in a fixed position during conveyance between the first point and the second point; and
   the top surface of the second conveyor unit and the bottom surface of the fourth conveyor unit that hold at least a portion of the stem in a fixed position during conveyance between the first point and the second point.

3. The apparatus of claim 1, further comprising:
   at least a portion of the third conveyor unit disposed substantially parallel to at least a portion of the first conveyor unit; and
   at least a portion of the fourth conveyor unit disposed substantially parallel to at least a portion of the second portion of the second conveyor unit.

4. The apparatus of claim 1, wherein the separation force between the pod and the stem separates the stem and the calyx from the pod at an area of the produce between the calyx and the pod with the stem attached to the calyx.

5. The apparatus of claim 1, wherein the produce moves at a constant speed with at least the first conveyor unit and the second conveyor unit between the first point and the second point.

6. The apparatus of claim 1, further comprising:
   the at least one driving unit that conveys the produce from the first point to the second point to separate the stem and the calyx from the pod between the first point and the second point in the absence of a cutting blade disposed between the first point and the second point and in the absence of a separation obstacle contacts the produce and disposed between the first point and the second point.

7. The apparatus of claim 1, further comprising:
   an aligning unit that aligns the produce with at least a portion of the pod disposed on the top surface of the first conveyor unit and with at least a portion of the stem disposed on or above the second conveyor unit.

8. The apparatus of claim 1, wherein the first conveyor unit and the third conveyor unit that apply a compression force to at least a portion of the pod.

9. The apparatus of claim 1, wherein the second portion of the second conveyor unit and the fourth conveyor unit apply a compression force to at least a portion of the stem.

10. The apparatus of claim 1, wherein the angle is less than 25 degrees.

11. The apparatus of claim 1, further comprising:
    a shaft coupled with the at least one driving unit, the first conveyor unit and the second conveyor unit, the shaft and the at least one driving unit that operate the first conveyor unit and the second conveyor unit at a same speed.

12. The apparatus of claim 1, further comprising:
a shaft coupled with the at least one driving unit, the third conveyor unit and the fourth conveyor unit, the shaft and the at least one driving unit that operate the third conveyor unit and the fourth conveyor unit at a same speed.

13. The apparatus of claim 1, further comprising:
a mounting structure that supports at least one of the first conveyor unit, the second conveyor unit, the third conveyor unit, and the fourth conveyor unit.

14. The apparatus of claim 1, further comprising at least one of:
a bracket connected to the first conveyor unit, that supports the third conveyor unit; and
a bracket connected to the second conveyor unit, that supports the fourth conveyor unit.

15. The apparatus of claim 1, wherein the first conveyor unit has a width of less than 10 inches and a length of greater than 10 inches, and wherein the second conveyor unit has a width of less than 6 inches.

16. The apparatus of claim 1, wherein the opening is a first opening, further comprising:
the top surface of the first conveyor unit and the bottom surface of the third conveyor unit configured to define the first opening having a height of less than three inches between the top surface of the first conveyor unit and the bottom surface of the third conveyor unit; and
the top surface of the second conveyor unit and the bottom surface of the fourth conveyor unit configured to define a second opening having a height of less than 0.25 inches between the top surface of the second conveyor unit and the bottom surface of the fourth conveyor unit.

* * * * *